United States Patent
Forney

(10) Patent No.: US 9,265,346 B1
(45) Date of Patent: Feb. 23, 2016

(54) RESPONSIVE SUPPORT SYSTEM AND MOUNT

(71) Applicant: Anthony Eugene Forney, Aloha, OR (US)

(72) Inventor: Anthony Eugene Forney, Aloha, OR (US)

(*) Notice: Subject to any disclaimer, the term of this patent is extended or adjusted under 35 U.S.C. 154(b) by 0 days.

(21) Appl. No.: 14/658,113

(22) Filed: Mar. 13, 2015

(51) Int. Cl.
*A47F 7/00* (2006.01)
*A47B 97/00* (2006.01)

(52) U.S. Cl.
CPC .............. *A47B 97/001* (2013.01); *A47B 97/00* (2013.01); *A47B 2097/005* (2013.01)

(58) Field of Classification Search
CPC . A47B 97/001; A47B 97/00; A47B 2097/005
USPC ........ 211/26; 248/274.1, 276.1, 277.1, 279.1, 248/283.1, 917, 919–923; 312/245, 9.4, 312/34.2, 135, 24, 136, 246, 248, 249.7, 312/315, 319.2
See application file for complete search history.

(56) References Cited

U.S. PATENT DOCUMENTS

| | | | | |
|---|---|---|---|---|
| 876,159 A * | 1/1908 | Erickson | ................ | A47B 46/00 144/285 |
| 1,517,730 A * | 12/1924 | Joannet | ................ | A47B 21/02 312/24 |
| 3,172,632 A * | 3/1965 | Borg | ................ | A47B 88/06 248/201 |
| 3,358,957 A * | 12/1967 | Lindenmuth | ................ | F16M 11/04 248/279.1 |
| 4,134,629 A * | 1/1979 | Hansen | ................ | A47B 46/005 312/246 |
| 4,447,031 A * | 5/1984 | Souder, Jr. | ................ | F16M 11/04 248/281.11 |
| 4,565,343 A * | 1/1986 | Lake, Jr. | ................ | F16M 11/04 248/346.06 |
| 4,723,680 A * | 2/1988 | Carroll | ................ | A47B 88/18 220/478 |
| 5,165,644 A | 11/1992 | Allen | | |
| 5,173,686 A * | 12/1992 | Fujihara | ................ | G09F 9/35 248/920 |
| 5,329,865 A * | 7/1994 | McWard | ................ | A47B 46/005 108/93 |
| 5,398,901 A | 3/1995 | Brodmann et al. | | |

(Continued)

FOREIGN PATENT DOCUMENTS

WO     WO8802593 A1     4/1988

OTHER PUBLICATIONS

StandsandMounuts.com, "Atlantic Large Articulating 19" to 17"TV Wall Mount (Black) 63607068," http://www.standsandmounts.com/AtlanticLargeArticulating37to64TVWallMountBlack63607068.aspx, at least as early as Feb. 19, 2015, 3 pages.

(Continued)

*Primary Examiner* — Joshua J Michener
*Assistant Examiner* — Devin Barnett
(74) *Attorney, Agent, or Firm* — Law Office of Karen Dana Oster, LLC

(57) ABSTRACT

A responsive support system described herein includes a screen device wall support mount and a media machine responsive support mount. A media machine responsive support mount described herein may include a support that may support a media machine, a rotating subsystem for rotating the support, and a lifting subsystem for lifting the support.

17 Claims, 27 Drawing Sheets

(56) References Cited

U.S. PATENT DOCUMENTS

| | | | | |
|---|---|---|---|---|
| 5,407,261 A * | 4/1995 | Mercer | ............... | A47B 46/005 312/245 |
| 5,553,820 A | 9/1996 | Karten et al. | | |
| 5,646,819 A * | 7/1997 | Hill, III | ............... | A47B 21/0314 312/223.2 |
| 5,738,320 A * | 4/1998 | Matos | ............... | A47B 81/061 108/1 |
| 5,797,568 A * | 8/1998 | Canton Gongora | ... | F16M 11/10 248/122.1 |
| 5,842,672 A | 12/1998 | Sweere et al. | | |
| 5,873,200 A | 2/1999 | Henderson | | |
| 6,024,337 A * | 2/2000 | Correa | ............... | G06F 1/1603 248/442.2 |
| 6,138,966 A | 10/2000 | Smith | | |
| 6,309,038 B1 | 10/2001 | Domenig | | |
| 6,382,005 B1 | 5/2002 | White et al. | | |
| 6,418,010 B1 | 7/2002 | Sawyer | | |
| 6,435,634 B1 | 8/2002 | Webb et al. | | |
| 6,604,722 B1 * | 8/2003 | Tan | ............... | F16M 11/10 248/276.1 |
| 6,752,363 B2 * | 6/2004 | Boele | ............... | F16M 11/04 248/183.1 |
| 6,827,409 B2 * | 12/2004 | Michael | ............... | A47B 21/0073 248/920 |
| 6,905,101 B1 | 6/2005 | Dittmer | | |
| 6,991,199 B2 * | 1/2006 | Carpentier | ............... | A47B 9/02 108/144.11 |
| 7,140,703 B1 | 11/2006 | Holdgate, III et al. | | |
| 7,178,774 B2 | 2/2007 | Kim | | |
| 7,487,943 B1 * | 2/2009 | Gillespie | ............... | F16M 11/04 248/279.1 |
| 7,770,986 B1 | 8/2010 | Simaitis | | |
| 7,878,470 B2 * | 2/2011 | Oh | ............... | F16M 11/10 248/278.1 |
| 7,950,756 B2 * | 5/2011 | Collins | ............... | F25D 25/02 312/248 |
| 8,009,414 B2 | 8/2011 | Ishida et al. | | |
| 8,011,742 B1 | 9/2011 | Whitted | | |
| 8,094,438 B2 | 1/2012 | Dittmer et al. | | |
| 8,245,990 B2 * | 8/2012 | Huang | ............... | F16M 11/04 248/276.1 |
| 8,315,047 B2 * | 11/2012 | Tsuchihashi | ............... | G06F 1/1616 248/919 |
| 8,382,052 B1 * | 2/2013 | Mathieson | ............... | F16M 11/046 248/202.1 |
| 8,413,822 B2 * | 4/2013 | Bailey | ............... | A47B 23/043 211/175 |
| 8,424,693 B1 | 4/2013 | Hoover | | |
| 8,523,129 B2 * | 9/2013 | Stifal | ............... | F16M 11/10 248/276.1 |
| 8,596,728 B2 * | 12/2013 | Rozestraten | ............... | A47B 21/0073 312/319.5 |
| 8,693,172 B2 | 4/2014 | Russell et al. | | |
| 8,797,728 B2 * | 8/2014 | Han | ............... | F16M 11/10 248/917 |
| 8,864,092 B2 * | 10/2014 | Newville | ............... | F16M 11/08 248/123.11 |
| 8,888,062 B2 * | 11/2014 | Novin | ............... | F16M 11/04 248/274.1 |
| 8,910,580 B1 | 12/2014 | Cockrell | | |
| 8,926,031 B2 * | 1/2015 | Belton | ............... | A47B 88/04 312/246 |
| 2006/0186294 A1 * | 8/2006 | Van Groesen | ............... | F16M 11/04 248/284.1 |
| 2006/0221261 A1 * | 10/2006 | Ogawa | ............... | H04N 5/64 348/794 |
| 2006/0244700 A1 * | 11/2006 | Sano | ............... | G06F 1/1601 345/87 |
| 2007/0023593 A1 * | 2/2007 | Fedewa | ............... | F16M 11/10 248/201 |
| 2007/0221807 A1 * | 9/2007 | Park | ............... | F16M 11/10 248/324 |
| 2008/0001048 A1 * | 1/2008 | Woo | ............... | F16M 11/04 248/276.1 |
| 2008/0078906 A1 * | 4/2008 | Hung | ............... | F16M 11/10 248/276.1 |
| 2008/0253071 A1 * | 10/2008 | Stoelinga | ............... | F16M 11/04 361/679.06 |
| 2009/0050763 A1 * | 2/2009 | Dittmer | ............... | F16M 11/10 248/284.1 |
| 2009/0058240 A1 * | 3/2009 | Stuwe | ............... | A47B 51/00 312/248 |
| 2009/0179128 A1 * | 7/2009 | Boberg | ............... | F16M 11/10 248/278.1 |
| 2012/0241578 A1 * | 9/2012 | Huang | ............... | F16M 11/10 248/279.1 |
| 2012/0255919 A1 | 10/2012 | Jones et al. | | |
| 2013/0032682 A1 * | 2/2013 | Bell | ............... | F16M 11/10 248/277.1 |
| 2013/0082156 A1 | 4/2013 | Conner | | |
| 2013/0187019 A1 | 7/2013 | Dittmer et al. | | |
| 2013/0257242 A1 * | 10/2013 | Bunch | ............... | A47B 46/005 312/249.7 |

OTHER PUBLICATIONS

Projectorsuperstore.com, "Dual Arm Swingout Mount for Flat-Panel Displays up to 50 lb/23 kg," http://www.projectorsuperstore.com/Shopping/product_details.cfm?ProductID=38527, at least as early as Feb. 15, 2015, 2 pages.

\* cited by examiner

RESPONSIVE SUPPORT SYSTEM AND MOUNT

BACKGROUND OF THE INVENTION

Disclosed herein is a responsive support system including a responsive support mount, a preferred responsive support system may include a responsive support mount (for supporting a media machine) that may be associated with a wall support mount (for supporting a screen device).

Unlike old-school televisions that were housed in "entertainment systems" that felt like furniture, increasingly popular flat panel displays are typically mounted on a structure, such as a wall. Because the flat panel displays (a type of "screen device") are relatively lightweight and often have "optimum" viewing angles (e.g. directly in front of the display), there are many wall-mounting devices that allow a user to manipulate the location and/or angle of the mounted flat panel display. Exemplary wall-mounting devices are disclosed in U.S. Pat. No. 5,165,644 to Allen, U.S. Pat. No. 5,398,901 to Brodmann et al., U.S. Pat. No. 5,553,820 to Karten et al., U.S. Pat. No. 5,842,672 to Sweere et al., U.S. Pat. No. 6,418,010 to Sawyer, U.S. Pat. No. 6,905,101 to Dittmer, U.S. Pat. No. 7,178,774 to Kim, U.S. Pat. No. 8,094,438 to Dittmer et al., U.S. Pat. No. 8,693,172 to Russell et al., U.S. Patent Application Publication No. 2013/0082156 to Conner, and U.S. Patent Application Publication No. 2013/0187019 to Dittmer et al. These exemplary wall-mounting devices are meant to be exemplary, not limiting.

Using the wall-mounting devices with a screen device was problematic because of the multitude of cables running between the screen device and associated media machines (e.g. DVD players). As there had to be enough cable between the screen device and the media machines and the greatest distance that there might be therebetween, the cables were relatively long and hard to hide. A solution that was tried was a shelf that attached to the top of the screen device. The media machine was set on the shelf above the media machine. This configuration had two major problems. First, if the screen device was relatively high, the media machine on top of the screen device tended to be difficult to access. Second, setting a media machine above the screen device on a shelf tended to be dangerous in that they were susceptible to bumps and it was easy to knock the media machine off the shelf. Examples of prior art shelves designed to be associated with the top of a monitor include U.S. Pat. No. 6,138,966 to Smith and U.S. Pat. No. 8,009,414 to Ishida et al.

It should be noted that prior art exists that relates to mounting assemblies that have storage below the television. Examples of these include U.S. Pat. No. 8,910,580 to Cockrell (the "Cockrell reference") and U.S. Patent Application Publication No. 2012/0255919 to Jones et al. (the "Jones reference"). The Cockrell reference discloses a wall mount cabinet assembly for mounting a flat screen television to a wall that also provides storage space for additional items below the television. The Jones reference discloses a panel television mounting assembly that includes, in one embodiment, a shelf for supporting a television accessory below the panel television.

Finally, it should be noted that prior art exists that relates to shelves, drawers, and racks that transition between multiple positions. Examples of these include U.S. Pat. No. 6,309,038 to Domenig, U.S. Pat. No. 6,435,634 to Webb et al., U.S. Pat. No. 7,770,986 to Simaitis, U.S. Pat. No. 8,011,742 to Whitted, U.S. Pat. No. 8,424,693 to Hoover, and International Publication No. WO88/02593 to Ostman.

BRIEF SUMMARY OF THE INVENTION

Disclosed herein is a responsive support system including a responsive support mount, a preferred responsive support system may include a responsive support mount (for supporting a media machine) that may be associated with a wall support mount (for supporting a screen device).

Described herein is a responsive support system, including a screen device wall support mount and a media machine responsive support mount. The screen device wall support mount may have at least one storage position and at least one accessible position. The media machine responsive support mount may have at least one storage position and at least one accessible position and may have at least one storage orientation and at least one accessible orientation. The media machine responsive support mount transitions between the at least one storage position and orientation and the at least one accessible position and orientation.

The media machine responsive support mount may support a media machine and the screen device wall support mount may support a screen device. The at least one storage orientation of the media machine responsive support mount may be generally vertical and at least one accessible orientation of the media machine responsive support mount may be generally horizontal. The media machine responsive support mount may be below the screen device wall support mount.

One preferred screen device wall support mount may have at least one storage orientation and at least one accessible orientation. One preferred screen device wall support mount may have at least one vertical storage orientation and at least one angled accessible orientation.

The media machine responsive support mount may transition between the at least one storage position and orientation and the at least one accessible position and orientation upon actuation of the screen device wall support mount.

The media machine responsive support mount may have a rotating subsystem and a lifting subsystem. The rotating subsystem and the lifting subsystem may facilitate the transition of the media machine responsive support mount between the at least one storage position and orientation and the at least one accessible position and orientation.

Also described herein is a media machine responsive support mount, including a support that may support a media machine, a rotating subsystem for rotating the support, and a lifting subsystem for lifting the support. The media machine responsive support mount may have at least one storage position and at least one accessible position and may have at least one storage orientation and at least one accessible orientation. The media machine responsive support mount preferably transitions between the at least one storage position and orientation and the at least one accessible position and orientation, the rotating subsystem and the lifting subsystem facilitating the transition of the media machine responsive support mount between the at least one storage position and orientation and the at least one accessible position and orientation.

The at least one storage orientation of the media machine responsive support mount may be generally vertical and at least one accessible orientation of the media machine responsive support mount may be generally horizontal.

The media machine responsive support mount may transition between the at least one storage position and orientation and the at least one accessible position and orientation upon actuation.

The media machine responsive support mount may be associatable with a screen device wall support mount that may support a screen device, the screen device wall support mount preferably having at least one storage position and at least one accessible position.

The media machine responsive support mount may be associatable with a screen device wall support mount that may support a screen device, the screen device wall support mount may have at least one storage position and at least one accessible position. The media machine responsive support mount may transition between the at least one storage position and orientation and the at least one accessible position and orientation upon actuation of the transition of the screen device wall support mount between the at least one storage position and the at least one accessible position.

Also described herein is a responsive support system, including a screen device wall support mount and a media machine responsive support mount. The screen device wall support mount may have at least one storage position and at least one accessible position. The media machine responsive support mount may have a rotating subsystem and a lifting subsystem. The media machine responsive support mount may have at least one storage position and at least one accessible position, and may have at least one storage orientation and at least one accessible orientation. The media machine responsive support mount may transition between the at least one storage position and orientation and the at least one accessible position and orientation. The rotating subsystem and the lifting subsystem may facilitate the transition of the media machine responsive support mount between the at least one storage position and orientation and the at least one accessible position and orientation.

The media machine responsive support mount may support a media machine and the screen device wall support mount may support a screen device. The at least one storage orientation of the media machine responsive support mount may be generally vertical and the at least one accessible orientation of the media machine responsive support mount may be generally horizontal. The media machine responsive support mount may be below the screen device wall support mount.

The screen device wall support mount may have at least one storage orientation and at least one accessible orientation. The screen device wall support mount may have at least one vertical storage orientation and at least one angled accessible orientation.

The media machine responsive support mount may transition between the at least one storage position and orientation and the at least one accessible position and orientation upon actuation of the screen device wall support mount.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings illustrate various exemplary responsive support systems and/or provide teachings by which the various exemplary responsive support systems are more readily understood.

Figure 1:
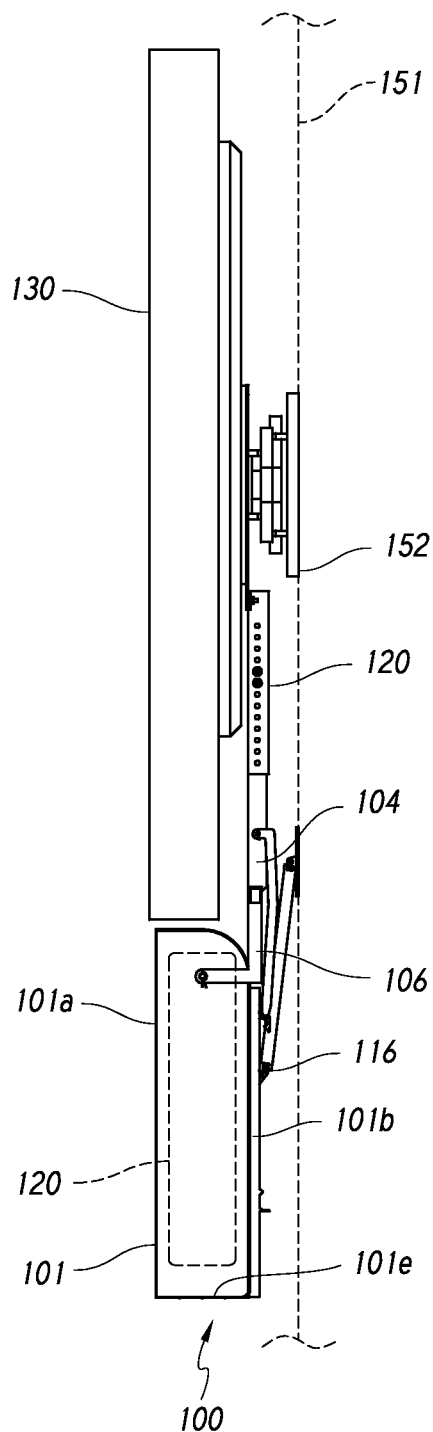
FIG. 1 is a first side view of an exemplary first preferred responsive support system in a storage position and a storage orientation, the responsive support system including a screen device wall support mount (and an associated screen device), and a media machine responsive support mount for supporting a media machine, the media machine responsive support mount including a rotating subsystem and a lifting subsystem, the second side view being a mirror image of the first side view.
Figure 2:
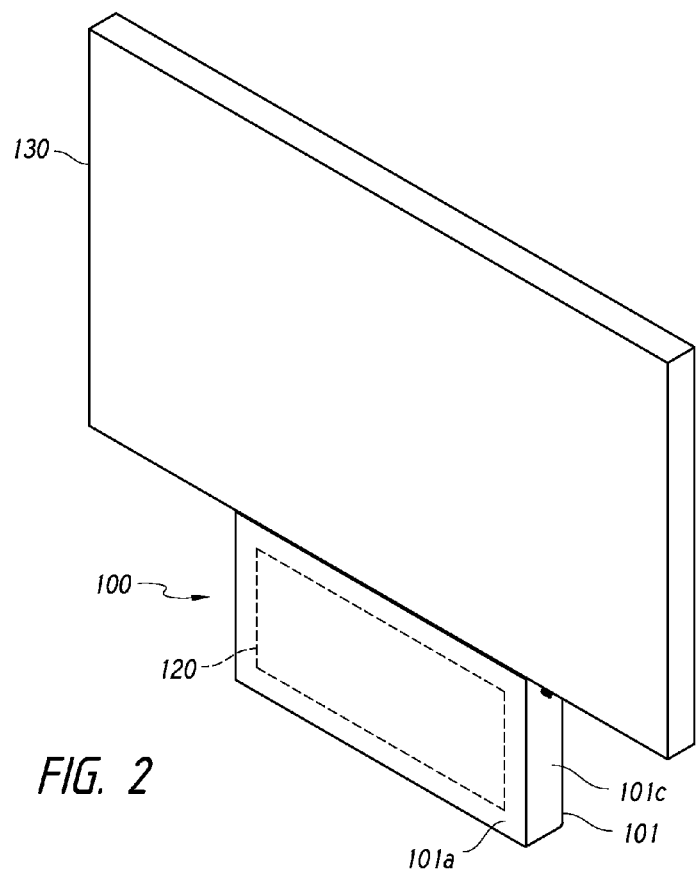
FIG. 2 is a front perspective view of the first preferred responsive support system of FIG. 1.
Figure 3:
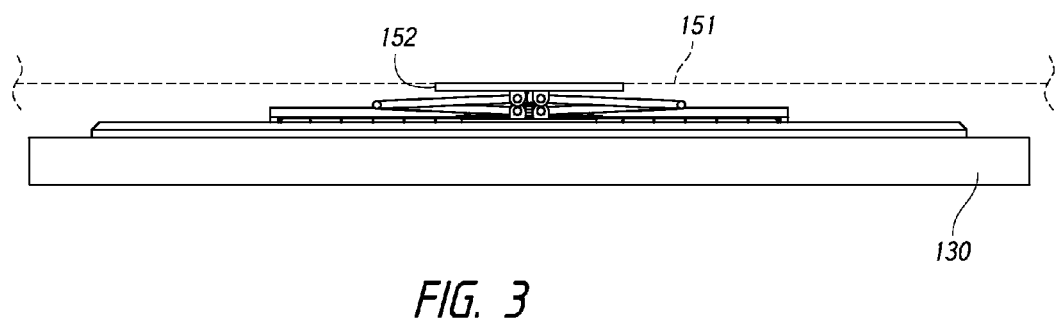
FIG. 3 is a top view of the first preferred responsive support system of FIG. 1.
Figure 4:
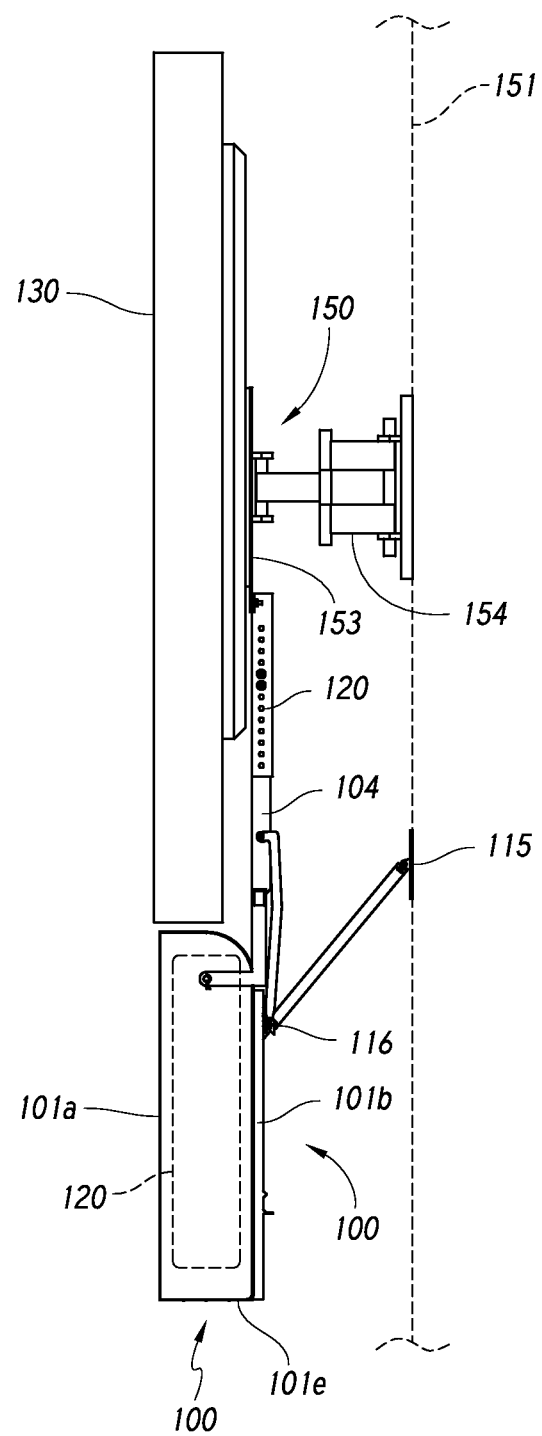
FIG. 4 is a first side view of the exemplary first preferred responsive support system in a first intermediate position and a first intermediate orientation, the second side view being a mirror image of the first side view.
Figure 5:
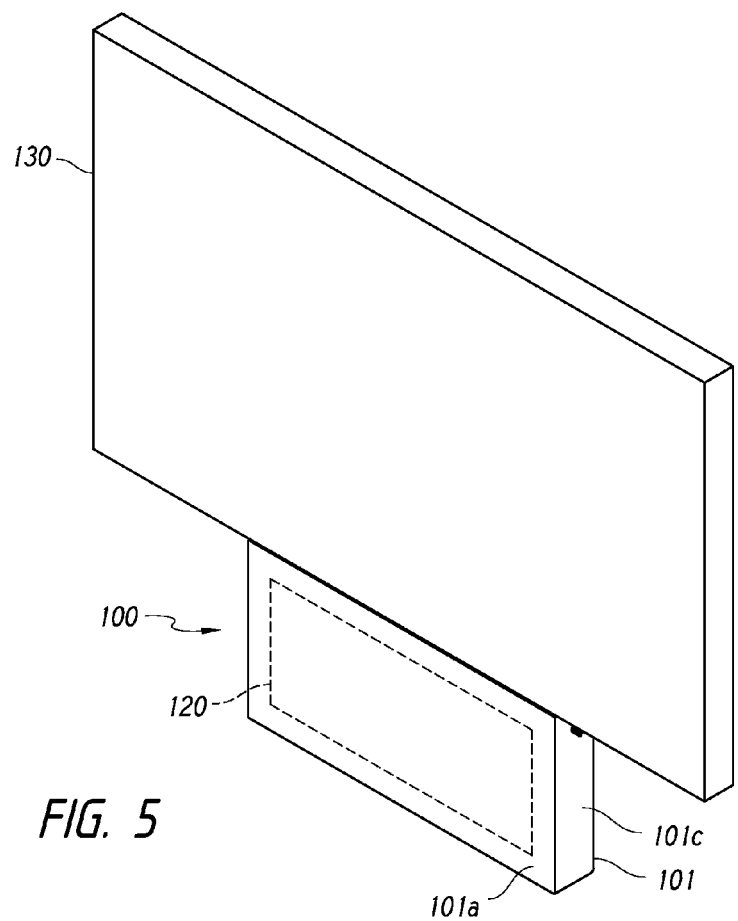
FIG. 5 is a front perspective view of the first preferred responsive support system of FIG. 4.
Figure 6:
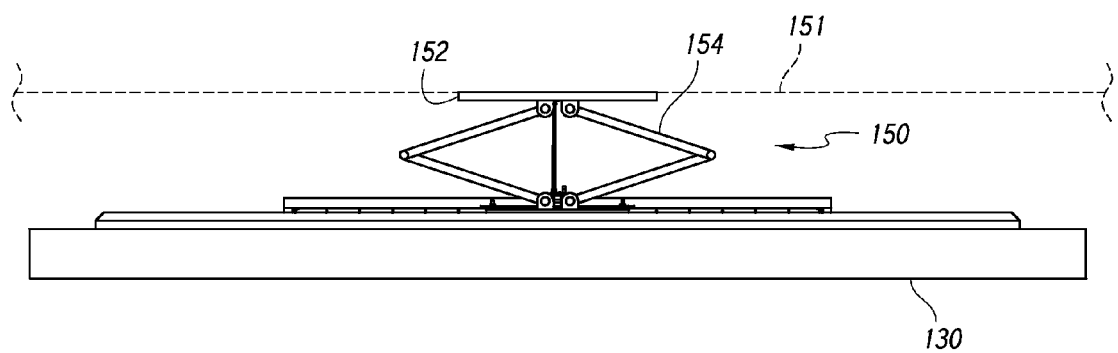
FIG. 6 is a top view of the first preferred responsive support system of FIG. 4.
Figure 7:
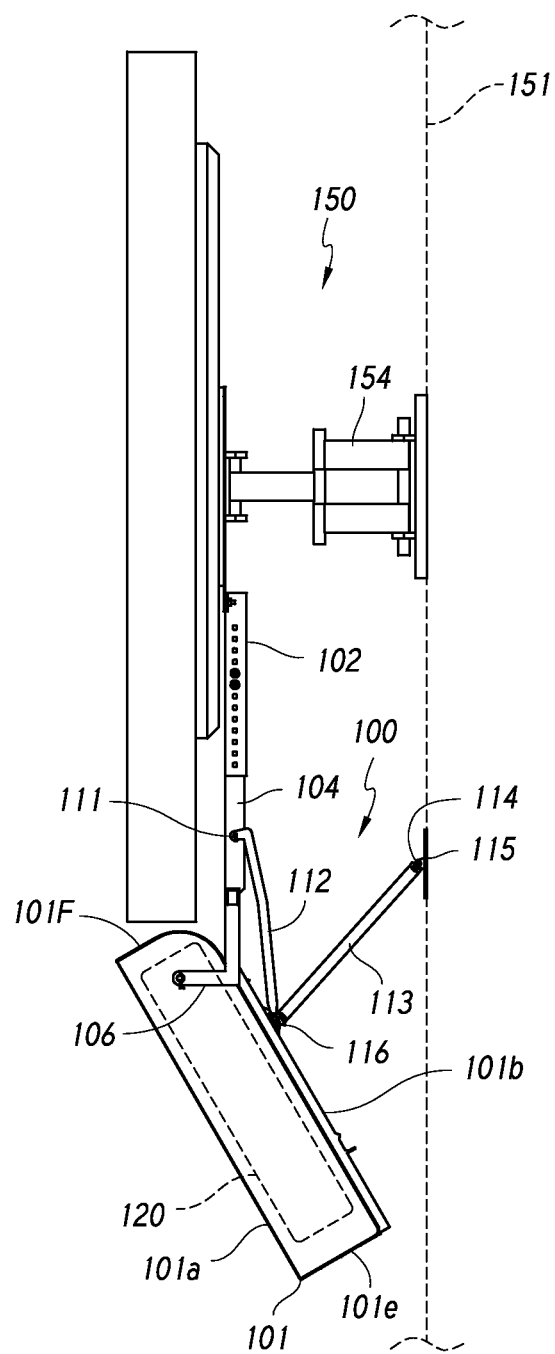
FIG. 7 is a first side view of the exemplary first preferred responsive support system in a second intermediate position and a second intermediate orientation, the second side view being a mirror image of the first side view.
Figure 8:
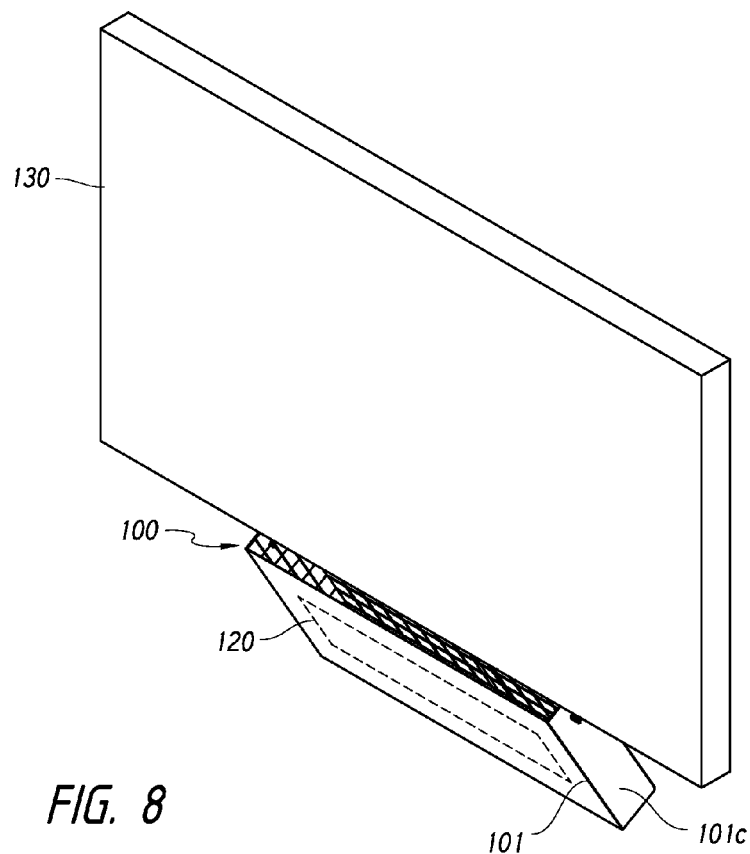
FIG. 8 is a front perspective view of the first preferred responsive support system of FIG. 7.
Figure 9:
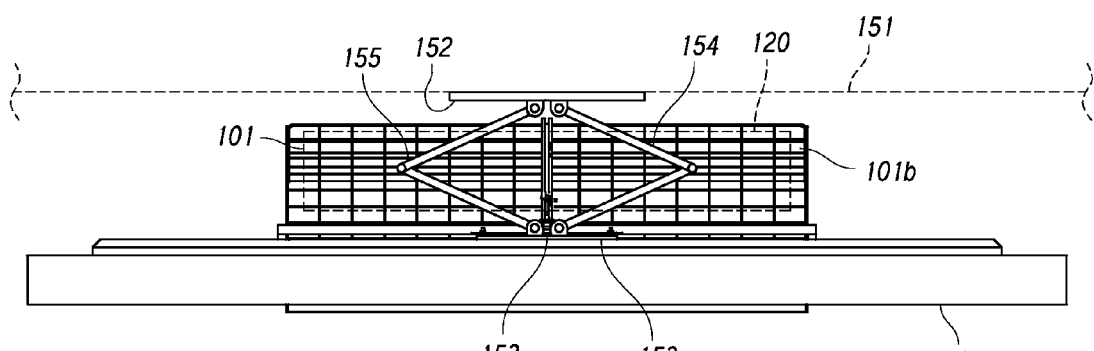
FIG. 9 is a top view of the first preferred responsive support system of FIG. 7.
Figure 10:
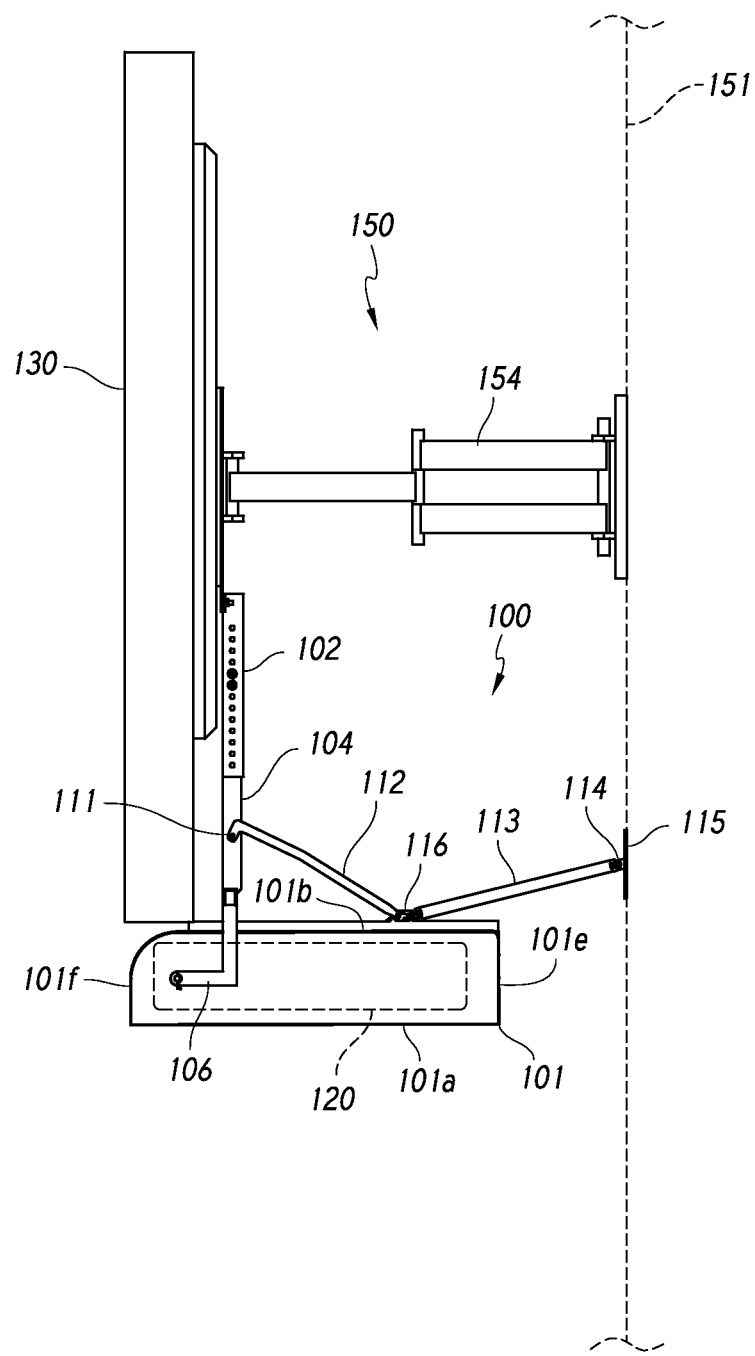
FIG. 10 is a first side view of the exemplary first preferred responsive support system in a third intermediate position and a third intermediate orientation, the second side view being a mirror image of the first side view.
Figure 11:
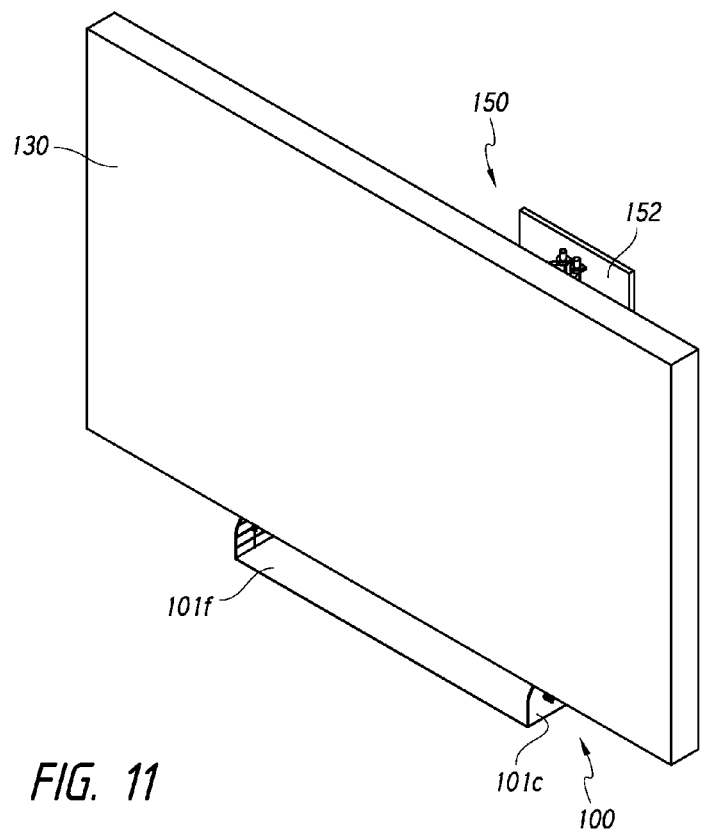
FIG. 11 is a front perspective view of the first preferred responsive support system of FIG. 10.
Figure 12:
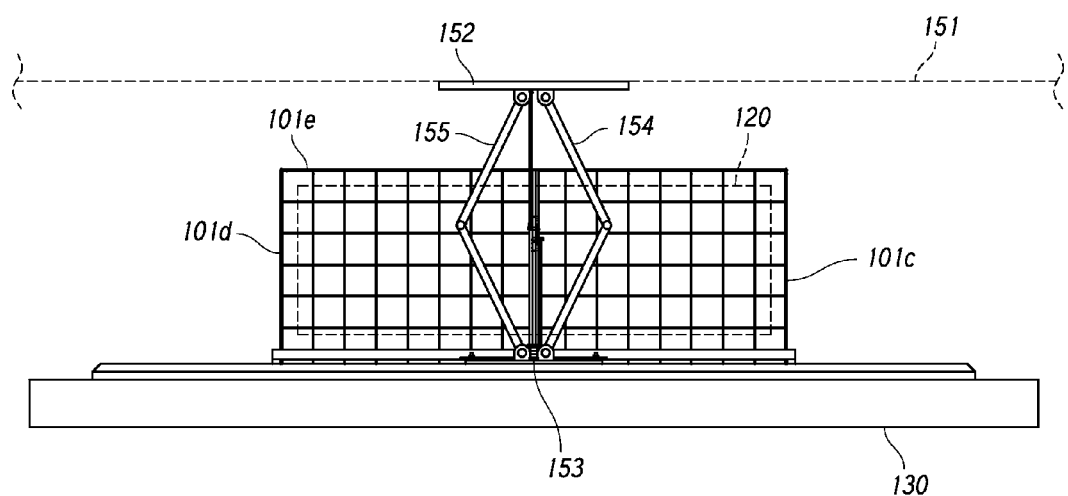
FIG. 12 is a top view of the first preferred responsive support system of FIG. 10.
Figure 13:
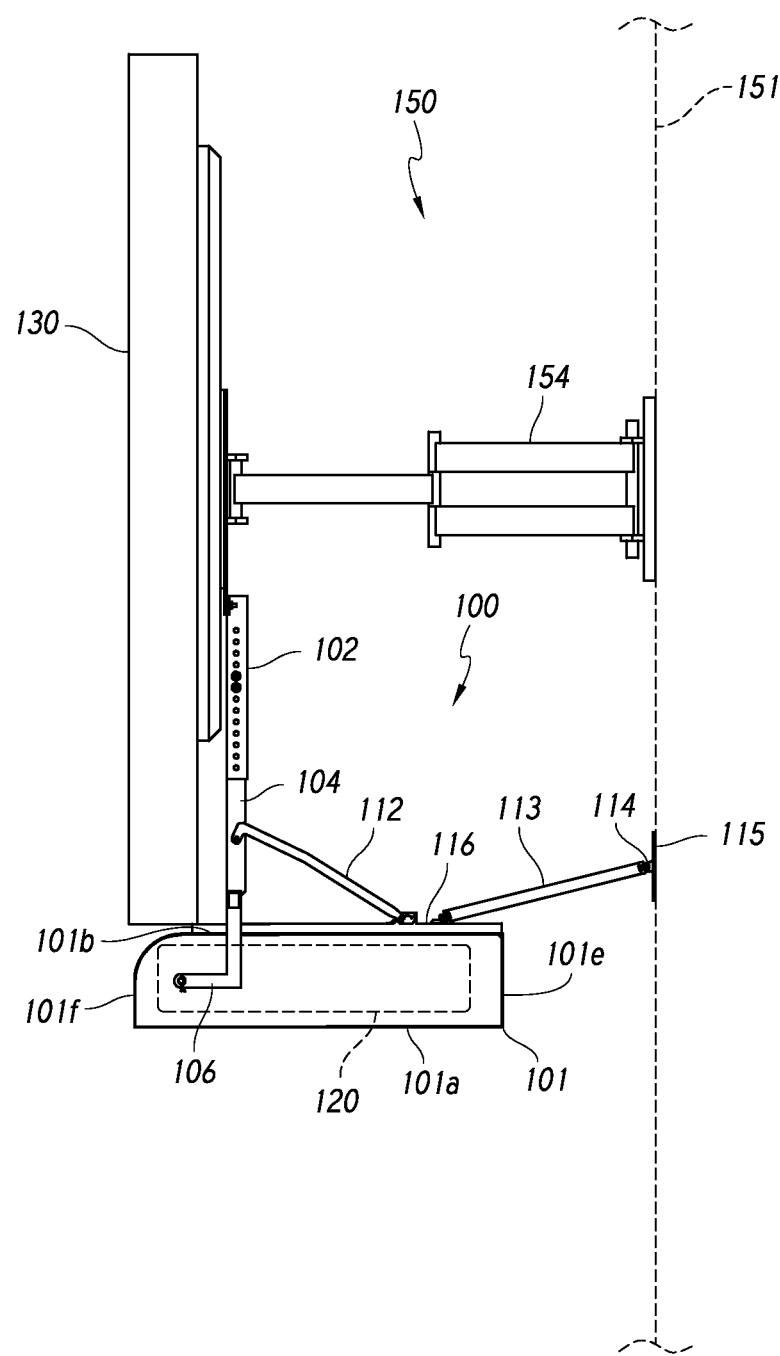
FIG. 13 a first side view of the exemplary first preferred responsive support system in an accessible position and an accessible orientation, the second side view being a mirror image of the first side view.
Figure 14:
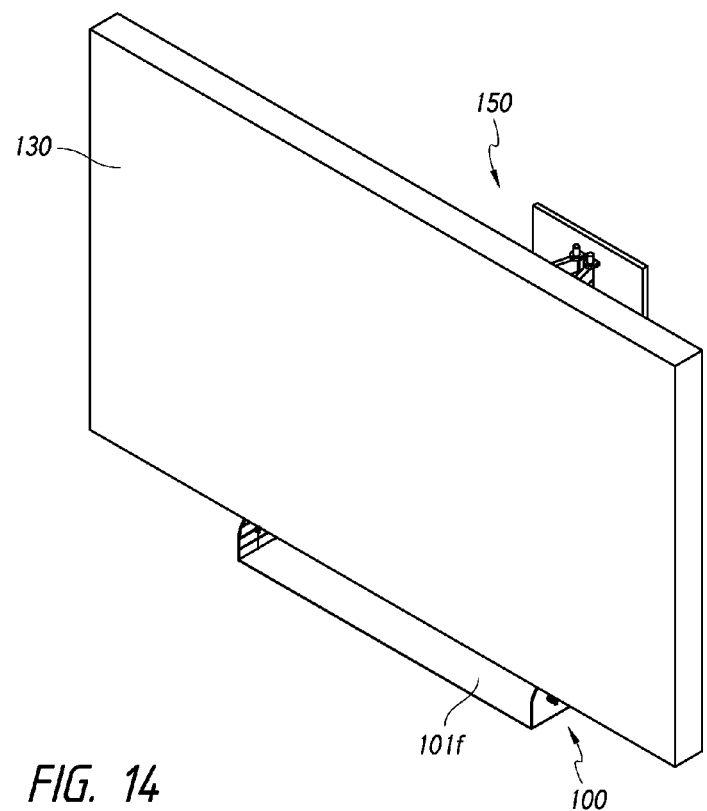
FIG. 14 is a front perspective view of the first preferred responsive support system of FIG. 13.
Figure 15:
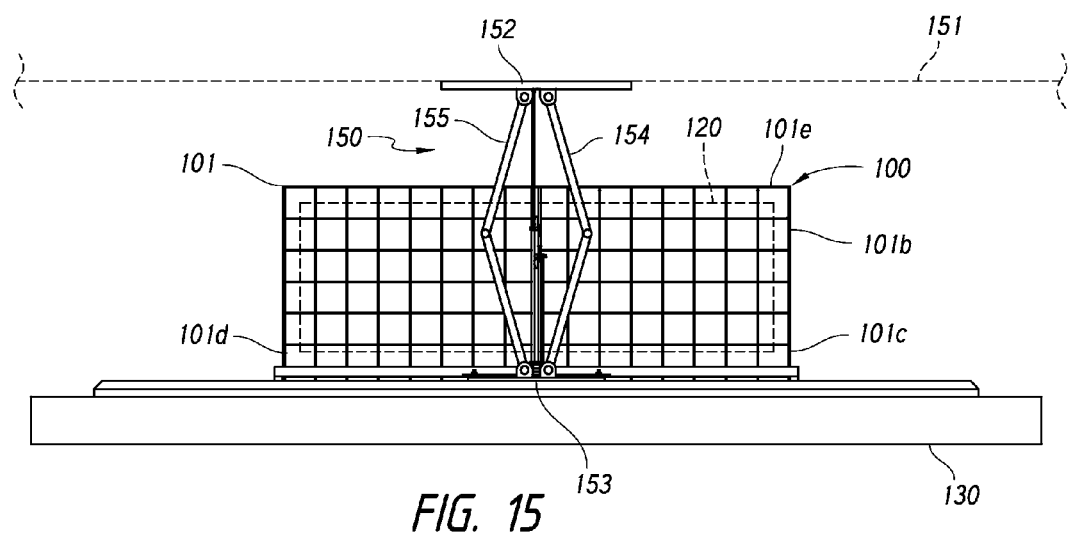
FIG. 15 is a top view of the first preferred responsive support system of FIG. 13.
Figure 16:
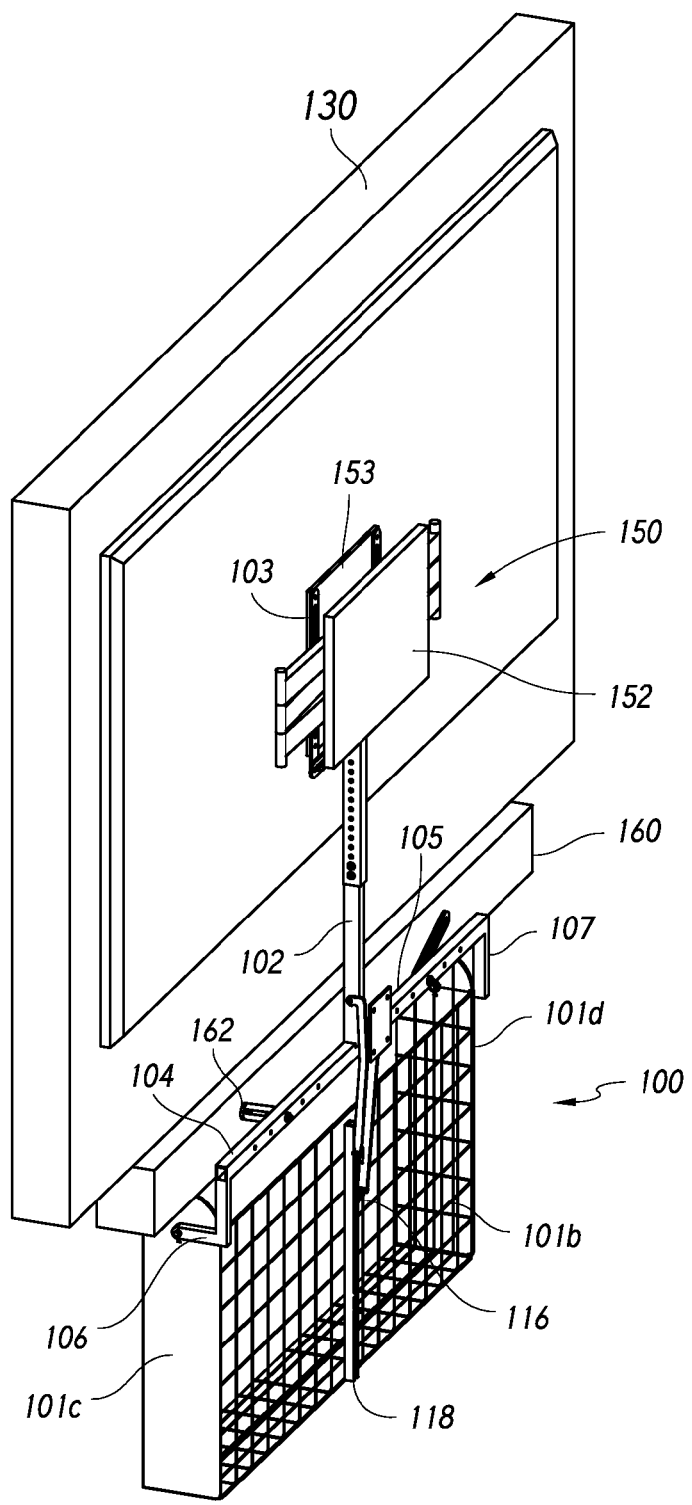
FIG. 16 is a back perspective view of an exemplary second preferred responsive support system in a storage position and storage orientation, the responsive support system including a screen device wall support mount (and an associated screen device), and a media machine responsive support mount for supporting a media machine, the media machine responsive support mount including a rotating subsystem and a lifting subsystem.
Figure 17:
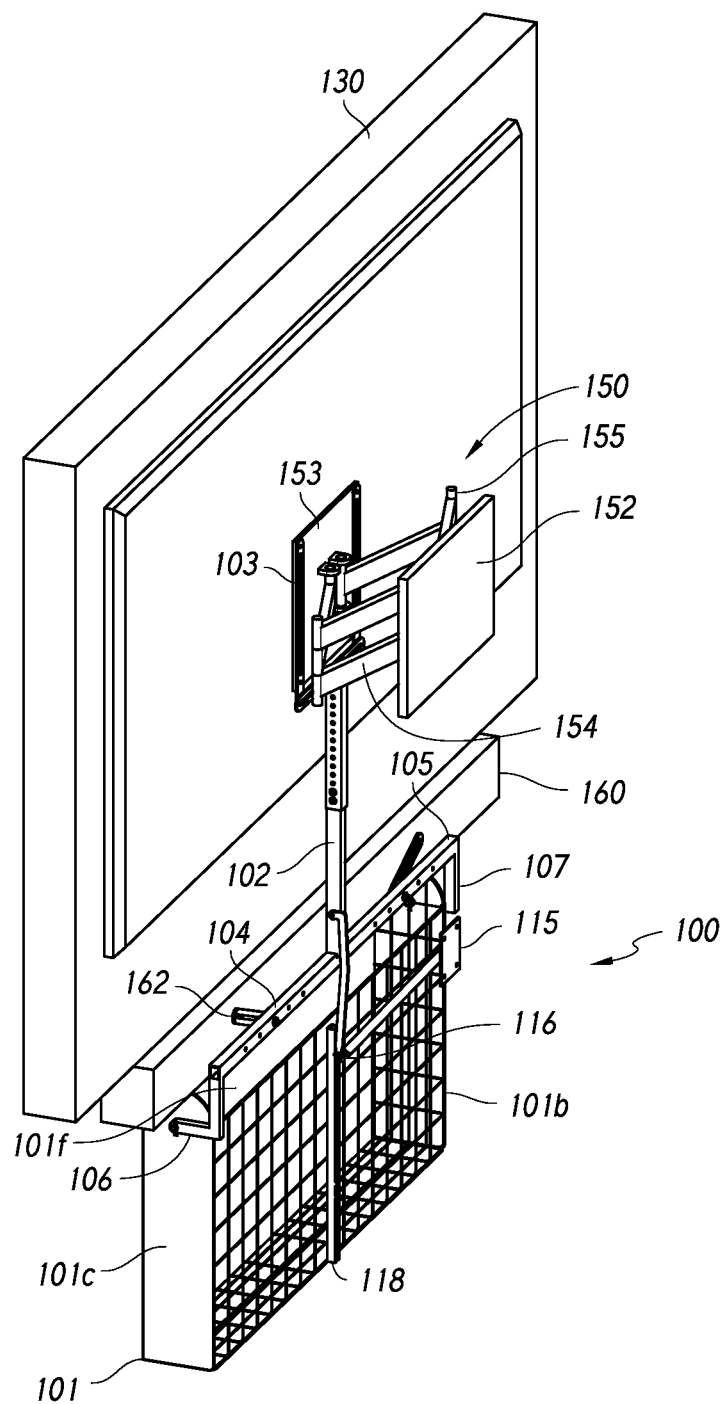
FIG. 17 is a back perspective view of the exemplary second preferred responsive support system of FIG. 16, the second preferred responsive system being in a first intermediate position and a first intermediate orientation.

Although the figures show one exemplary preferred scale, the drawing figures are not necessarily to scale for alternative embodiments. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Disclosed herein is a responsive support system including a media machine responsive support mount 100 (also referred to as the responsive support mount 100 and the secondary support mount 100) and a screen device wall support mount 150 (also referred to as the wall support mount 150 and the primary support mount 150). The responsive support mount 100 preferably supports a media machine 120. The wall support mount 150 preferably supports a screen device 130.

The responsive support mount 100 described herein has at least one storage position and at least one accessible position. The responsive support mount 100 described herein also has at least one storage orientation (most likely vertical, but it could be angled) and at least one accessible orientation (most likely horizontal, but it could be angled). The responsive support mount 100 preferably supports the media machine 120 below the screen device 130 (e.g. flat screen television or monitor). The responsive support mount 100 (with the media machine 120) transitions (e.g. rotates, slides, and/or pivots) between at least one storage position and/or orientation and at least one accessible position and/or orientation.

The screen device 130 would be held on a screen device wall support mount 150 that facilitates the manipulation of the associated screen device 130 into multiple different positions. The wall support mount 150 described herein has a storage position and at least one accessible position. The wall support mount 150 described herein may also have a storage orientation (most likely vertical, but it could be angled) and an accessible orientation (most likely angled). In the case of the screen device wall support mount 150, the "accessible position" and "accessible orientation" would most likely be a "viewing" position and "viewing" orientation. Depending on the location of the viewer(s), the viewing position may be, for example, to the left or right of the storage position or above or below the storage position. Depending on the location of the viewer(s), the viewing orientation may be, for example, angled to the left or right of the storage orientation or angled upwards or downwards from the storage orientation.

One preferred secondary support mount 100 would be associated with the primary support mount 150 such that the secondary support mount 100 transitions betweens positions/orientations when the user actuates (e.g. moves, pulls, pushes, or causes moving, pulling, or pushing) the primary support mount 150 (and the associate screen device 130) from its storage position to its accessible position.

Exemplary secondary responsive support mounts 100 may be better understood with reference to the drawings, but these drawings are not intended to be of a limiting nature. The same reference numbers will be used throughout the drawings and description in this document to refer to the same or like parts.

DEFINITIONS

Before describing the secondary responsive support mount 100 and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The term "support" (when used as a noun) is defined to mean support structure or housing structure. The "support" is also referred to as a media machine support 101. Exemplary supports include, but are not limited to, a shelf, an enclosure, a drawer, a box, a tray, and other supporting structure known or yet to be discovered that may be used to support a media machine 120. The phrase "responsive support mount" means a support structure or housing structure that transitions between positions and orientations including at least one "storage position" and "storage orientation" and at least one "accessible position" and "accessible orientation." The terms "support" and "supporting" (when used as verbs) are defined to include supporting in any sense of the word (e.g. below, above, between, and to the side) including within (e.g. a housing, drawer, or box would provide support when the media machine 120 is within the support).

The term "position" is directed to a physical location such as against the wall 151, away from the wall 151, to the right of center, to the left of center, above the center, and/or below the center. (The "center" being defined as the middle physical location, such as when the screen device bracket 153 is directly in line with the wall bracket 152.) The accessible position(s) may also be relative to the storage position(s), such as the accessible positions may be to the right or left of the storage position and/or the accessible positions may be above and/or below the storage position.

The term "orientation" is directed to particular angles ranging from vertical to horizontal. In most cases, "vertical" would be parallel to the wall. In most cases, "horizontal" would be perpendicular to the wall. Alternative orientations could have alternative angles (e.g. the front being raised or lowered to allow better user access). The "angles" may be, for example, 1° to 45° above the horizontal or 1° to 45° below the horizontal. Put another way, the support could be oriented such that, while its back end is substantially at the horizontal, its front end could be positioned anywhere from halfway up from the horizontal to the vertical to halfway down from the horizontal to the vertical.

The phrase "media machine" is defined to mean a device capable of providing audio/visual signals to a screen device 130. "Audio/visual signals" include, but are not limited to, visual signals television programs, video signals (e.g. from media machines 120 such as cable boxes, DVD players, Blu-ray players, and VHS players), and/or interactive displays (e.g. from a computing device such as a computer or CPU). A media machine 120 may provide only audio signals (e.g. a CD player), only visual signals, or both audio signals and visual signals. Exemplary media machines 120 include, but are not limited to, cable boxes, DVD players, Blu-ray players, VHS players, CD players, CPUs, and other media machines known or yet to be discovered.

The phrase "screen device" is defined to mean image displaying devices or viewing devices capable of providing audio/visual signals to a user. Exemplary screen devices 130 include, but are not limited to, televisions (e.g. a flat screen or flat panel television), monitors (e.g. a computer monitor), and other viewing devices known or yet to be discovered.

Figure 32:
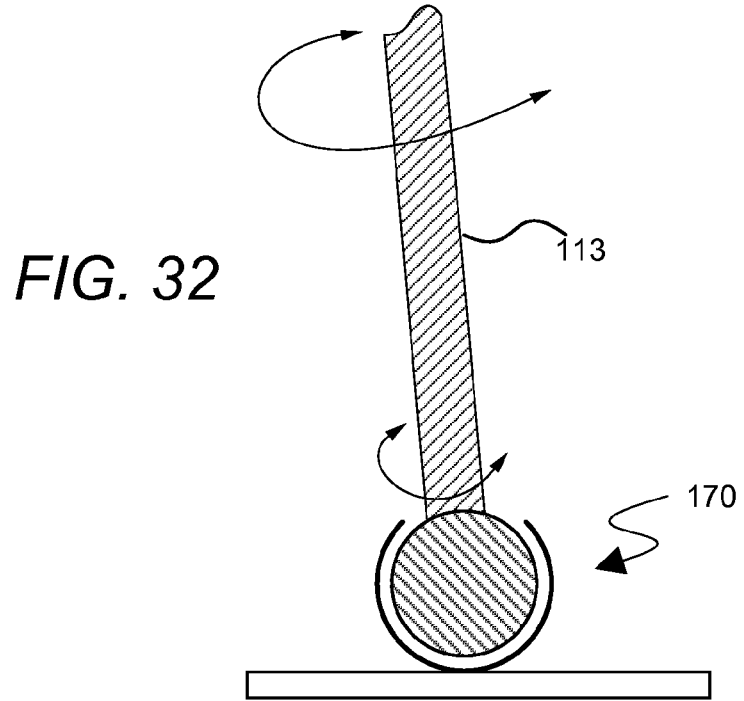
FIG. 32 is a cross-sectional view of an exemplary simplified ball joint that could replace shown hinges.

The phrase "wall support mount" is defined to mean structure that can be used to mount a screen device 130 to a wall 151, allow a user to manipulate the screen device 130 such that it is at an optimum viewing position, and allow a user to manipulate the screen device 130 such that it is in a storage position. Put another way, the wall support mount 150 allows the manipulation of the associated screen device 130 into multiple different positions. The term "wall" (shown as the phantom wall 151) is meant to include any relatively stable surface to which a screen device 130 might be attached including, but not limited to, a wall or wall unit, a post, a movable "cart" specifically adapted to holding a screen device 130, and heavy "furniture" (e.g. a stand, shelving, or an entertainment center). The wall support mounts 150 may include articulated arms, hinges (including ball joints such as the ball joint 170 shown in FIG. 32), mechanical linkages, springs, biasing devices, and latches. Exemplary wall support mounts 150 include, but are not limited to, those described in the Background, and other wall-mounting devices known or yet to be discovered that may be used to both mount a screen device 130 to a wall 151 and to allow the manipulation of the associated screen device 130 into multiple different positions.

The terms "actuate" and "actuating" refer to the process or step of initiating or starting. For example, a user can actuate (e.g. start) the transition (move) the secondary responsive support mount 100 between at least one storage position and at least one accessible position. Actuating may be accomplished physically by, for example, pushing, pulling, or otherwise physically or manually moving. Actuating may also be automated such that there are appropriate electrical, mechanical, electro-mechanical, and/or digital interfaces that would accept input (e.g. a push of a button, a voice command, or a signal from a handheld device (e.g. remote control or smart phone with an application thereon) and translate the input into the beginning of the movement. Automated actuation could be considered "remote control" and would have the necessary structure to accomplish the necessary actuation and movement.

It should be further noted that although the overall "system" (the responsive support system) is described in terms of smaller "subsystems" (whether labeled specifically as subsystems or not). The responsive support mount and the wall support mount may be considered subsystems. The responsive support mount is described as being divided into two further subsystems: a rotating subsystem and a lifting subsystem. Although described as separate subsystems, the separate descriptions are not meant to be limiting. Separately described subsystems may be formed as unitary systems. Also, subsystems may be further divided into smaller (less complex) subsystems.

The term "associated", unless specifically set forth otherwise, is defined to mean integral or original, retrofitted, attached, connected (including functionally connected), positioned near, and/or accessible by. For example, if a primary support mount 150 is associated with a secondary support mount 100, the secondary support mount 100 may be an original responsive support mount built into the screen device wall support mount, a secondary support mount that has been retrofitted into the screen device wall support mount, and/or an attached secondary support mount that is attached to the screen device wall support mount.

It should be noted that relative terms (e.g. primary and secondary) are meant to help in the understanding of the technology and are not meant to limit the scope of the invention. Similarly, unless specifically stated otherwise, the terms "first," "second," and "third" are meant solely for purposes of designation and not for order or limitation. For example, the "first preferred exemplary intermediate position" may or may not have an order relationship with the "second preferred exemplary intermediate position" and/or the "third preferred exemplary intermediate position."

It should be noted that some terms used in this specification are meant to be relative. For example, the term "top" is meant to be relative to the term "bottom." The term "front" is meant to be relative to the term "back," and the term "side" is meant to describe a "face" or "view" that connects the "front" and the "back." Another example is that the terms "horizontal" and "vertical" meant to be relative and, if there was rotation, the terms would change accordingly. Rotation of the system or component that would change the designation might change the terminology, but not the concept.

The terms "may," "might," "can," and "could" are used to indicate alternatives and optional features and only should be construed as a limitation if specifically included in the claims. For example, the "may" in the phrase the "responsive support mount 100 in the accessible position(s) and/or orientation(s) may move with the wall support mount 150 (and screen device 130) sideways, vertically, and/or multi-directionally" indicates that the responsive support mount 100 does not necessarily move with the wall support mount 150.

It should be noted that the various components, features, steps, or embodiments thereof are all "preferred" whether or not it is specifically indicated. Claims not including a specific limitation should not be construed to include that limitation.

Unless specifically stated otherwise, the term "exemplary" is meant to indicate an example, representative, and/or illustration of a type. The term "exemplary" does not necessarily mean the best or most desired of the type. For example, shown rotating subsystem and a lifting subsystem are "exemplary" in that they provide an example of a rotating subsystem and an example of a lifting subsystem. Other rotating subsystems and lifting subsystems could be just as desirable.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, contains, or comprises A and B, but optionally may contain C or additional components other than A and B). It should be noted that, unless otherwise specified, the singular forms "a," "an," and "the" refer to one or more than one, unless the context clearly dictates otherwise.

The Screen Device Wall Support Mount:

As set forth, the screen device 130 would be held on a screen device wall support mount 150 that facilitates the manipulation of the associated screen device 130 into multiple different positions (and possibly orientations), one of which would be an optimum viewing position based on a user's preferences. This viewing position usually positions the screen device 130 away from the wall 151, although its exact position would be determined based, for example, on where the user (or users) will be sitting when watching the screen device 130. One of the positions is also a storage position. The storage position usually positions the screen device 130 substantially against the wall 151 so that the screen device 130 is at least relatively "out of the way."

Figure 33:
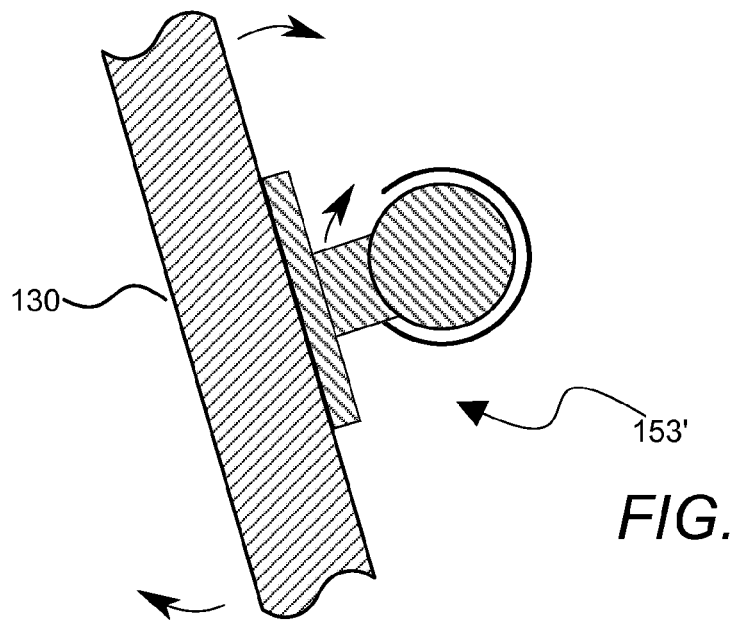
FIG. 33 is a cross-sectional view of an alternative screen device bracket that allows the screen device to change orientation (sideways, vertically, and/or multi-directionally).

The shown screen device wall support mount 150 has a wall bracket 152 for attachment to a wall 151 and a screen device bracket 153 for attachment to a screen device 130. Between the wall bracket 152 and the screen device bracket 153 is at least one linkage arm (shown as two linkage arms 154, 155) that allows the distance and/or relative position (e.g. above/below or left/right) between the wall bracket 152 and the screen device bracket 153 (and the wall 151 and screen device 130 to which they are attached) to be modified. The shown linkage arms 154, 155 are shown as sub-arms that are hinged together, but alternative linkage arms may use other means (e.g. telescoping members, ball joints, slides) for facilitating the modification of the distance and/or position. The shown linkage arms 154, 155 are shown as being hingedly attached at one end to the wall bracket 152 and hingedly attached at the other end to the screen device bracket 153. The shown hinges allow the wall support mount 150 to move the screen device 130 sideways (side-to-side, shown in FIGS. 21 and 22 as right and left). Alternative hinges could be used to allow the wall support mount 150 to move the screen device 130 vertically (up and down). Still other alternative structure (e.g. ball joints 170 such as the one shown in FIG. 32) could be used to allow the wall support mount 150 to move the screen device 130 multi-directionally. Alternatively, as shown in FIG. 33, an alternative screen device bracket 153' could include mechanisms for allowing the screen device 130 to change orientation (sideways, vertically, and/or multi-directionally).

Figure 31:
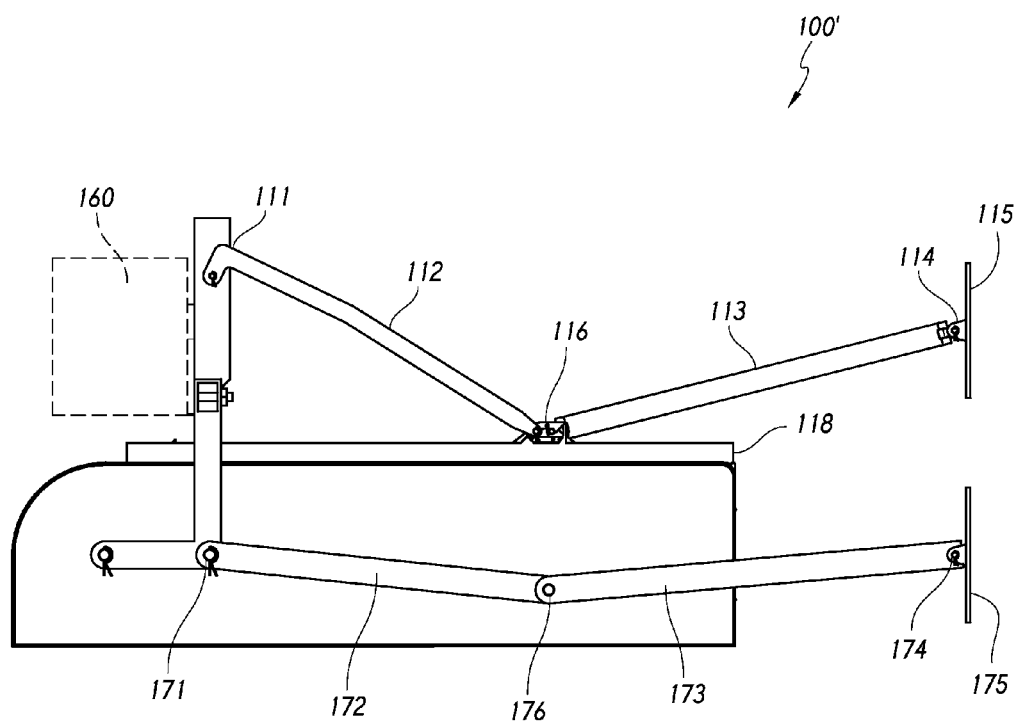
FIG. 31 is a first side view of a media machine responsive support mount, bar speaker, and media machine enclosure in an accessible position and orientation.

In addition to the shown exemplary screen device wall support mount 150, alternative exemplary wall support mounts include, but are not limited to, those described in the Background, and other wall-mounting devices known or yet to be discovered that may be used to both mount a screen device 130 to a wall 151 and to allow the manipulation of the associated screen device 130 into multiple different positions. In addition, as shown in FIG. 31, an alternative preferred responsive support system 101' may not include a specific wall-mounting device.

Figure 18:
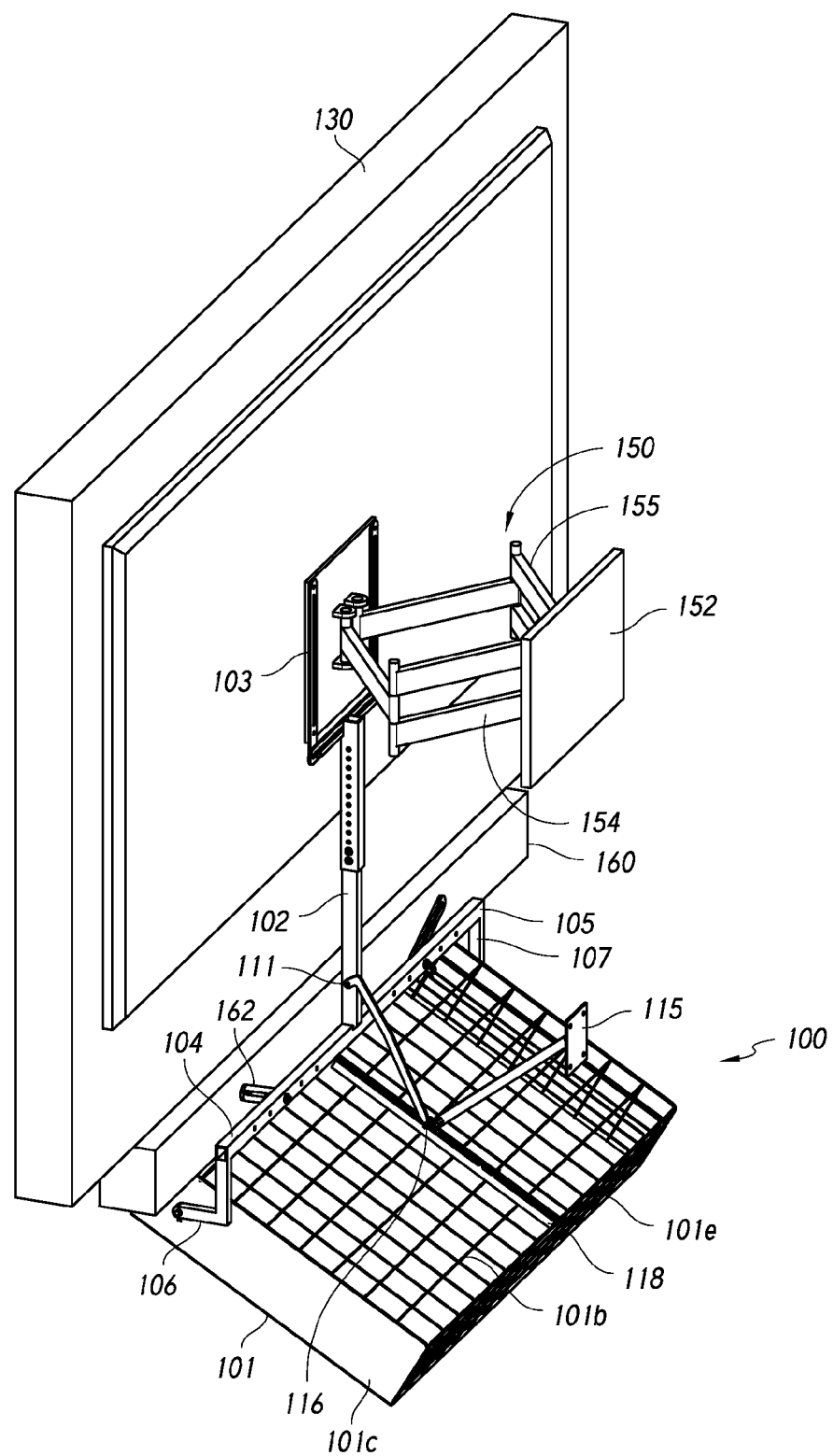
FIG. 18 is a back view of the exemplary second preferred responsive support system of FIG. 16, the second preferred responsive system being in a second intermediate position and a second intermediate orientation.
Figure 19:
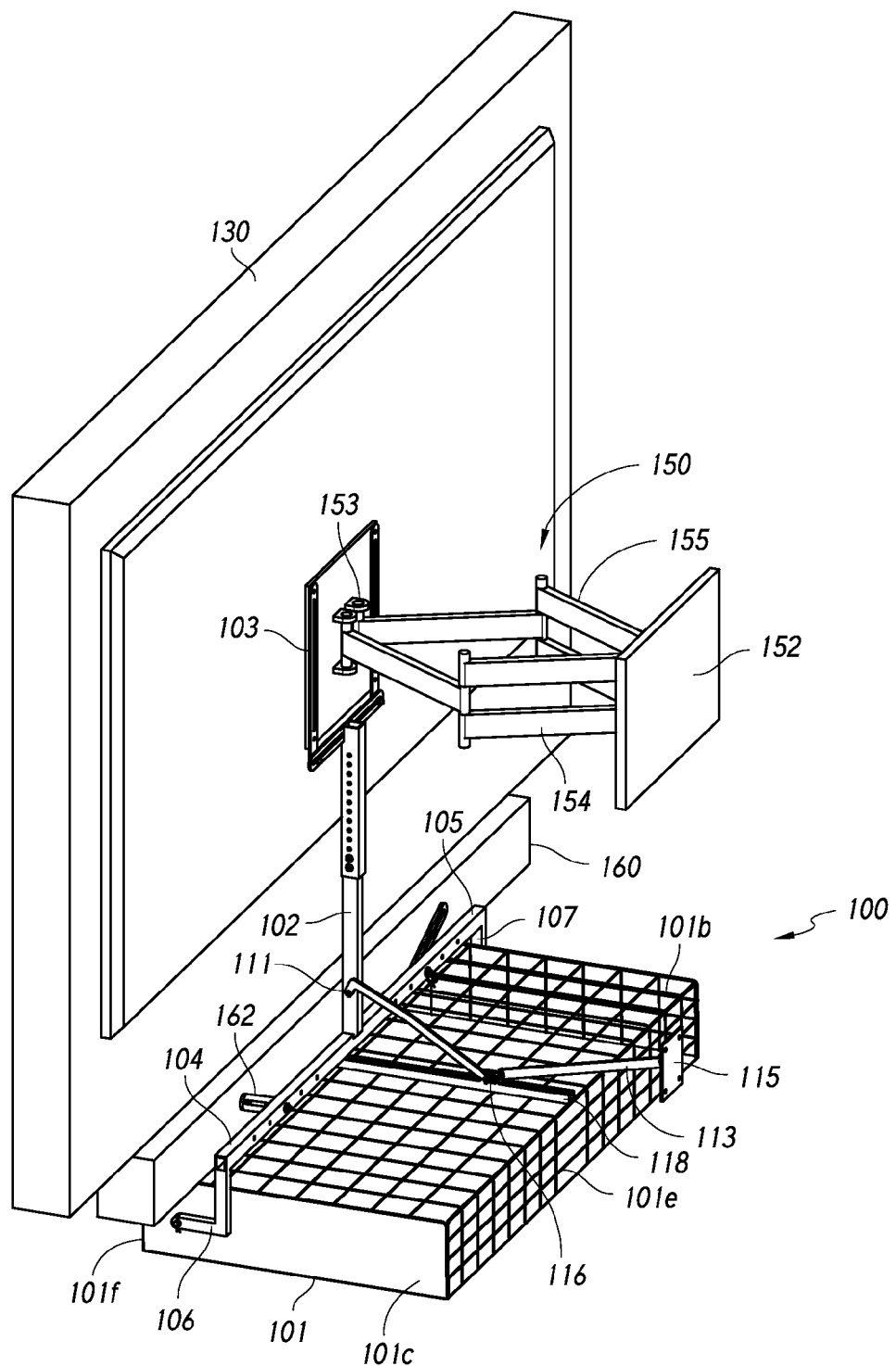
FIG. 19 is a back perspective view of the exemplary second preferred responsive support system of FIG. 16, the second preferred responsive system being in a third intermediate position and a third intermediate orientation.
Figure 20:
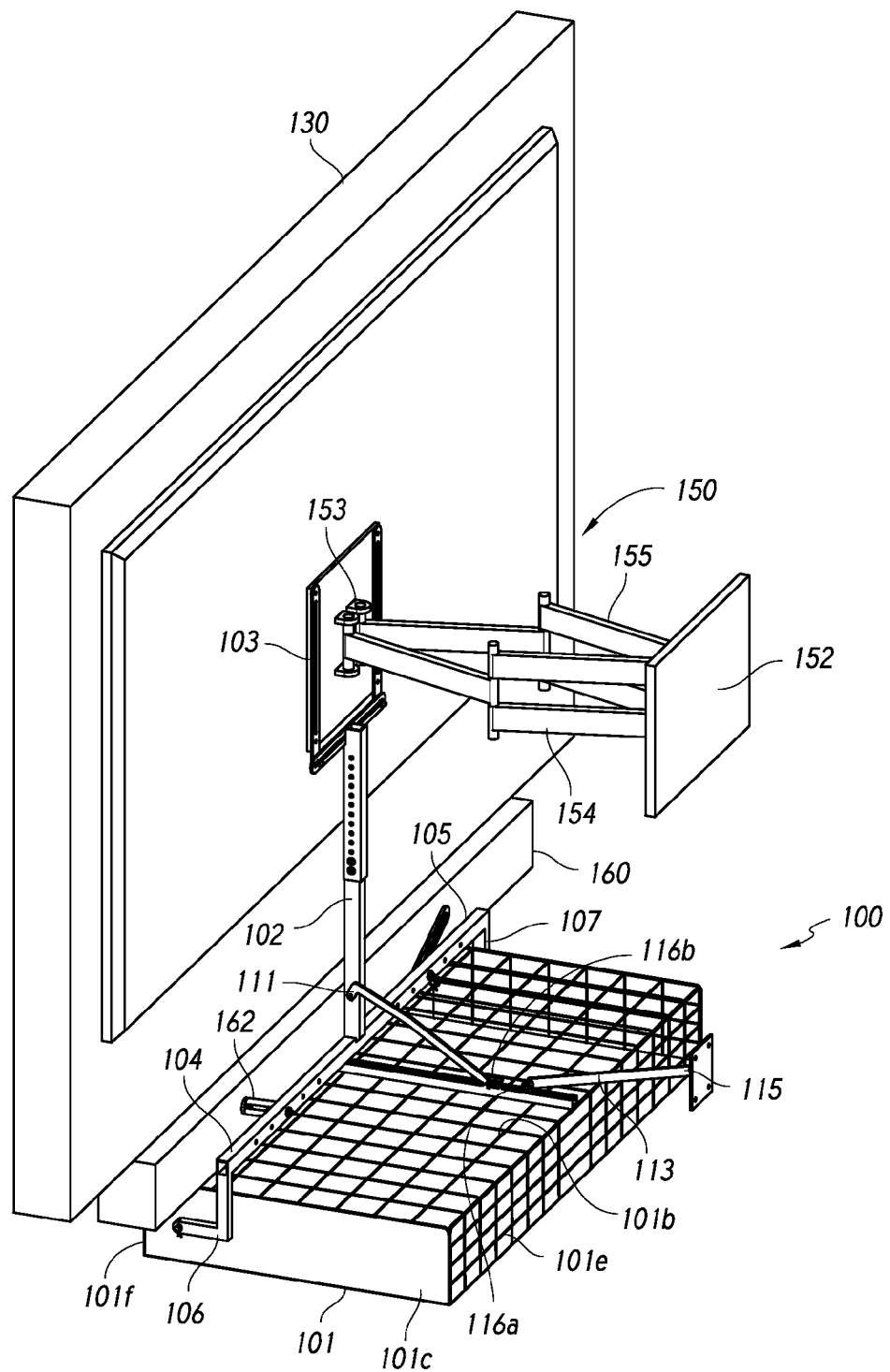
FIG. 20 is a back perspective view of the exemplary second preferred responsive support system of FIG. 16, the second preferred responsive system being in an accessible position and an accessible orientation.

The Media Machine Responsive Support Mount:

As set forth, the responsive support mount 100 supports a media machine 120 in relation to (usually below) a screen device 130. FIGS. 23-30 show an exemplary media machine responsive support mount 100 including a rotating subsystem and a lifting subsystem. These figures show the media machine responsive support mount 100 in an intermediate position and an intermediate orientation that is probably between the positions/orientations of FIG. 18 and FIG. 19.

The responsive support mount 100 includes a support 101 in which at least one media machine 120 is supported. The responsive support mount 100 (and the associated media machine 120) transitions (e.g. rotates, slides, and/or pivots) between at least one storage position and/or orientation and at least one accessible position and/or orientation. In the storage position(s) and/or orientation(s), the media machine 120 is preferably "out of the way" (usually near and substantially parallel to the wall 151). In the storage position(s) and/or orientation(s), the responsive support mount 100 preferably presents a relatively attractive "face" 101a and wires and cables between the media machine 120 and the screen device 130 are relatively hidden. In the accessible position(s) and/or orientation(s), a user is able to access the media machine 120 associated with the responsive support mount 100 such that the media machine 120 may be used. The responsive support mount 100 in the accessible position(s) and/or orientation(s) may move with the wall support mount 150 (and screen device 130) sideways, vertically, and/or multi-directionally.

As set forth, the shown responsive support mount 100 includes a support 101 in which at least one media machine 120 is supported. The support 101 may be adjustable in height, width, and/or depth to accommodate different media machines 120 or a plurality of media machines. The shown support 101 is a "box" that has a "face" 101a, a "back" 101b (opposite the face), and perimeter edges 101c-101f surrounding and separating the face 101a and the back 101b. The face 101a, is preferably an attractive face that may be, for example, a blank panel (e.g. brushed stainless steel), a mirror, artwork, camouflaged to blend in or contrast with surrounding structure (e.g. a white face that blended with the adjacent white walls, or a black face that contrasted with the adjacent white walls), or any other desired aesthetic. The back 101b preferably has openings or apertures through which wires and cables (e.g. the connectors between the media machine 120 and the screen device 130) may be passed. As shown, the back 101b is made of a wire mesh, but alternative structure (e.g. a solid structure with perforations therethrough) may be used. The perimeter edges 101c-101f include a first side perimeter edge 101c, a second side perimeter edge 101d (opposite the first side perimeter edge 101c), an enclosure side perimeter edge 101e, and an accessible side perimeter edge 101f (opposite the enclosure side perimeter edge 101e). Like the back 101b, the enclosure side perimeter edge 101e preferably has openings or apertures through which wires and cables may be passed. The first and second side perimeter edges 101c, 101d may also have openings or apertures through which wires and cables may be passed. The accessible side perimeter edge 101f may be completely open or may have an openable/closeable door that can selectively be opened by a user accessing the media machine 120.

The shown responsive support mount 100 can be thought of as including two overlapping and cooperative subsystems that functionally connect and manipulate the support 101: a rotating subsystem and a lifting subsystem. These two subsystems work together to facilitate and allow the support 101 to transition between positions/orientations.

The shown exemplary rotating subsystem links the support 101 to the screen device wall support mount 150 (and/or the screen device 130 itself). The rotating subsystem allows the support 101 to rotate and/or pivot. Elements of the exemplary rotating subsystem include an adjustable "spine" support member 102, a "head" support member 103, laterally extending "leg" support members 104, 105 (which may be a single support member having two sides/legs), and "foot" support members 106, 107.

The support 101 is shown as being pivotally attached to the screen device wall support mount 150 (and/or the screen device 130 itself) via the adjustable spine support member 102 having the head support member 103 at one end (e.g. the top) and the laterally extending leg support members 104, 105 at the other end (e.g. the bottom). As shown, the head support member 103 is associated with the screen device wall support mount 150 (or the screen device 130 itself). The head support member 103 is preferably adjustable to accommodate different screen device wall support mounts 150 and/or screen devices 130. As shown, the leg support members 104, 105 extend laterally so that they are generally perpendicular to the spine support member 102 and roughly parallel to the wall 151. The spine support member 102 is shown as a telescoping member that may be adjusted to accommodate screen devices 130 of different heights and/or additional technology (e.g. audio equipment such as the speaker bar 160 shown in FIGS. 16-20). Once the spine support member 102 has been adjusted to the desired length, at least one mechanical securing mechanism (e.g. screws, set pins, or spring-loaded locking buttons) may be used to secure the spine support member 102 at the desired length. The leg support members 104, 105 may be adjustable (e.g. telescoping members that may be lengthened or shortened) to accommodate supports 101 of different widths. Once the leg support members 104, 105 have been adjusted to the desired length(es), at least one mechanical securing mechanism (e.g. screws, set pins, or spring-loaded locking buttons) may be used to secure the leg support members 104, 105 at the desired length(es). Alternatively, the leg support members 104, 105 may be pre-sized to work with an associated support 101 having a specific size. An alternative to the shown spine support member 102 and leg support members 104, 105, two adjustable spine/leg support members could extend from the head support member 103 in an adjustable downward "V-shape." As shown, at the end of each leg support member 104, 105 distal from the centrally located spine support member 102 is an "L-shaped" "foot" support member 106, 107, the free end of the vertical branch of the "L" may be attached to the end of each leg support member 104, 105, and the free end of the horizontal branch of the "L" may be pivotally attached to a respective side of the support 101 (first side perimeter edge 101c and second side perimeter edge 101d). Feet with alternative shapes may be used in place of the shown feet support members 106, 107. An alternative support 101 may include more than two foot support members that are attached to the leg support members 104, 105. An alternative support 101 could eliminate the leg support members 104, 105 and attach a single foot support member (which may be elongated) directly to the spine support member 102.

The shown exemplary lifting subsystem links the support 101 to both the rotating subsystem (e.g. the adjustable spine support member 102) and the wall 151. The lifting subsystem is shown as being slideably linked to the support 101. The lifting subsystem allows at least a portion of the support 101 (e.g. the back part) to lift and/or rise. The elements of the exemplary lifting subsystem can be thought of as roughly analogous to the elements of at least one arm. Elements of the exemplary lifting subsystem include a pivotable "shoulder" support member 111, a slidable and pivotable "upper arm" support member 112, a slidable and pivotable "lower arm" support member 113, a pivotable "wrist" support member 114, and "hand" or "bracket" support member 115. The wrist support member 114 is shown as a hinge that allows the support 101 to move sideways (side-to-side, shown in FIGS. 21 and 22 as right and left). Alternative "hinges" could be used to allow the support 101 to move vertically (up and down). Still other alternative structure (e.g. ball joints 170 such as the one shown in FIG. 32) could be used to allow the support 101 to move multi-directionally. An "elbow" support member 116 may connect the upper arm support member 112 and the lower arm support member 113. The exemplary lifting subsystem may also include at least one slide, track, or guide 118 that is associated with the support 101 (shown as generally spanning the center of the back 101b of the support 101). The upper arm support member 112 and the lower arm support member 113 (or the elbow support member 116 joining the upper arm support member 112 and the lower arm support member 113) are associated with the guide 118. One preferred configuration has the elbow support member 116 slideably positioned within the guide 118. Although a single, central guide 118 (and a single associated "arm") is shown, multiple central guides (and associated arms) could be used. For example, two or three guides (and associated arms) could be used.

The shown rotating subsystem and lifting subsystem are meant to be exemplary and could be combined or divided further. Preferably, whatever subsystem(s) is/are used, the subsystem(s) at least relatively smoothly transitions the support 101 between positions/orientations because "rough" transitions could damage the media machine 120 or cause media therein to skip. Preferably, whatever subsystem(s) is/are used, the subsystem(s) transitions the support 101 between generally vertical and generally horizontal (and back again). The shown subsystem(s) are configured such that the openings for media in the media machine 120 do not point downward (they point upward in the vertical orientation), but while this can be an advantage, depending on the media machine 120, it may not be absolutely required. This being said, it should be noted that alternative rotating subsystems and/or lifting subsystems could be used. For example, the lifting and/or rotating subsystem could incorporate elements of a "garage door" (e.g. U.S. Pat. No. 6,382,005), a "gate" (e.g. U.S. Pat. No. 5,873,200), a roll-top desk, or other structure that allows a transitioning between positions/orientations.

Transition Between Position(s) and Orientation(s):

As set forth above, the responsive support mount 100 (with the media machine 120) transitions (e.g. rotates, slides, and/or pivots) between at least one storage position and/or orientation and at least one accessible position and/or orientation. Similarly, the responsive support mount 100 (with the media machine 120) transitions (e.g. rotates, slides, and/or pivots) between at least one accessible position and/or orientation and at least one storage position and/or orientation. Although alternative responsive support mounts (e.g. as shown in FIG. 31) may not include the wall support mounts 150, preferred responsive support mounts 100 would have associated wall support mounts 150. Preferably the responsive support mount 100 moves in response to movement of the wall support mount 150 (or vice versa). Put another way, when the user actuates (e.g. moves or pulls) the primary support mount 150 (and the associate screen device 130) from its storage position to its viewing position, the responsive support mount 100 (with the media machine 120) transitions to an accessible position and/or orientation. The reverse is true in that when the user actuates (e.g. moves or pushes) the primary support mount 150 (and the associate screen device 130) from its viewing position to its storage position, the responsive support mount 100 (with the media machine 120) transitions to a storage position and/or orientation.

FIGS. 1-3 and 16 show exemplary preferred responsive support systems in an exemplary storage position (against the wall) and an exemplary storage orientation (vertical), the responsive support systems include a screen device wall support mount 150 (and an associated screen device 130), and a media machine responsive support mount 100 for supporting a media machine 120, the media machine responsive support mount 100 including a rotating subsystem and a lifting subsystem. In this storage position and orientation, the attractive face 101a is the predominant visible feature.

FIGS. 4-6 and 17, FIGS. 7-9 and 18, and FIGS. 10-12 and 19 show exemplary intermediate positions and orientations between the exemplary storage position and orientation an the exemplary accessible position and orientation. These intermediate positions and orientations are meant only to show some possible intermediate positions and orientations and many others are possible. FIGS. 4-6 and 17, however, show exemplary preferred responsive support systems in an exemplary first intermediate position and an exemplary first intermediate orientation. FIGS. 7-9 and 18 show exemplary preferred responsive support systems in an exemplary second intermediate position and an exemplary second intermediate orientation. FIGS. 10-12 and 19 show exemplary preferred responsive support systems in an exemplary third intermediate position and an exemplary third intermediate orientation.

Figure 21:
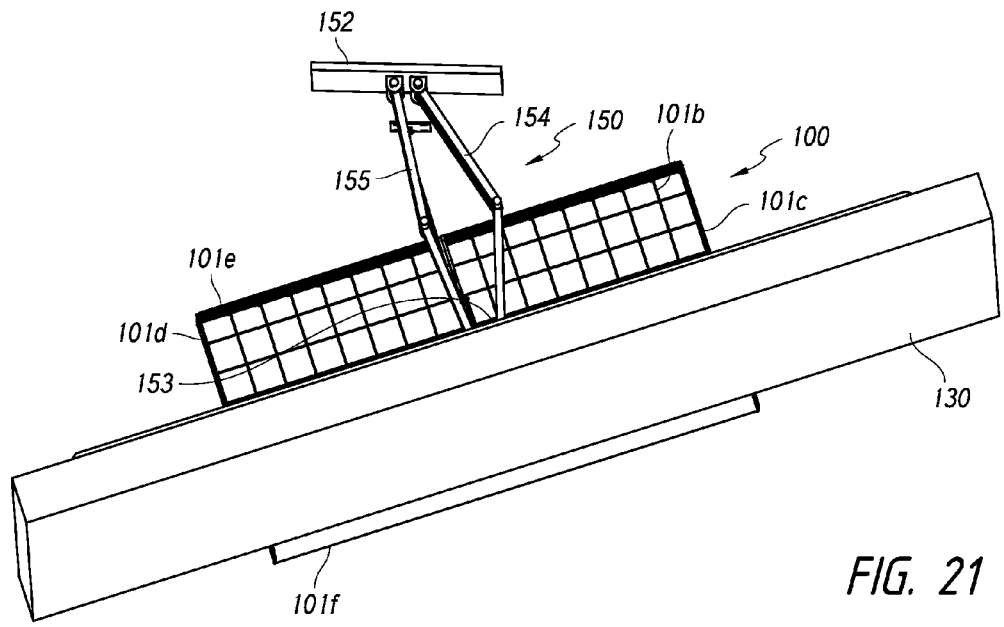
FIG. 21 is a top perspective view of an exemplary first preferred responsive support system in an accessible position and orientation, angled to the right.
Figure 22:
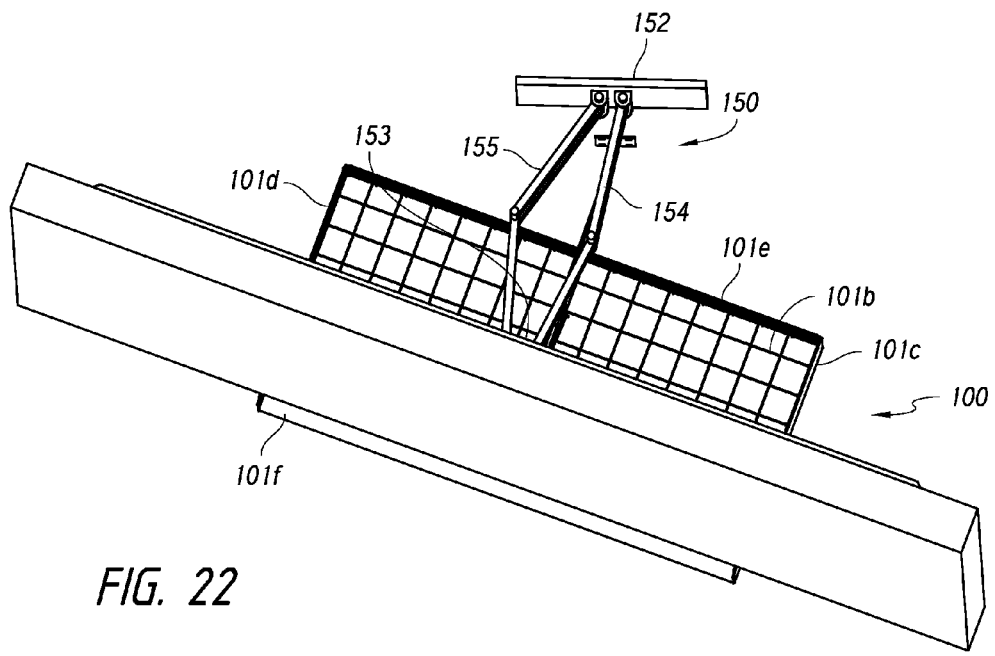
FIG. 22 is a top perspective view of an exemplary first preferred responsive support system in an accessible position and orientation, angled to the left.
Figure 23:
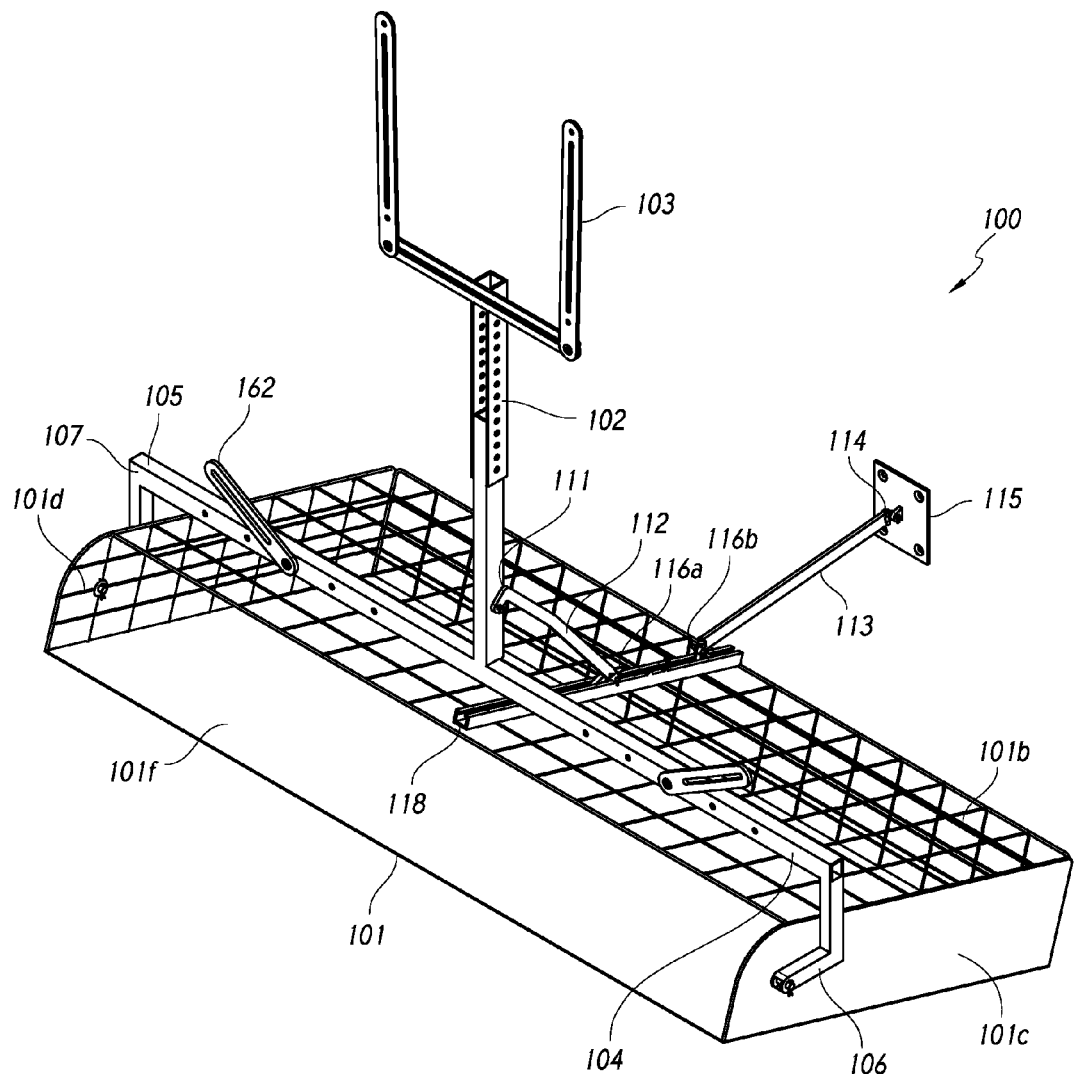
FIG. 23 is a front perspective view of a media machine responsive support mount for supporting a media machine, the media machine responsive support mount including a rotating subsystem and a lifting subsystem, the media machine responsive support mount being in an intermediate position and an intermediate orientation.
Figure 24:
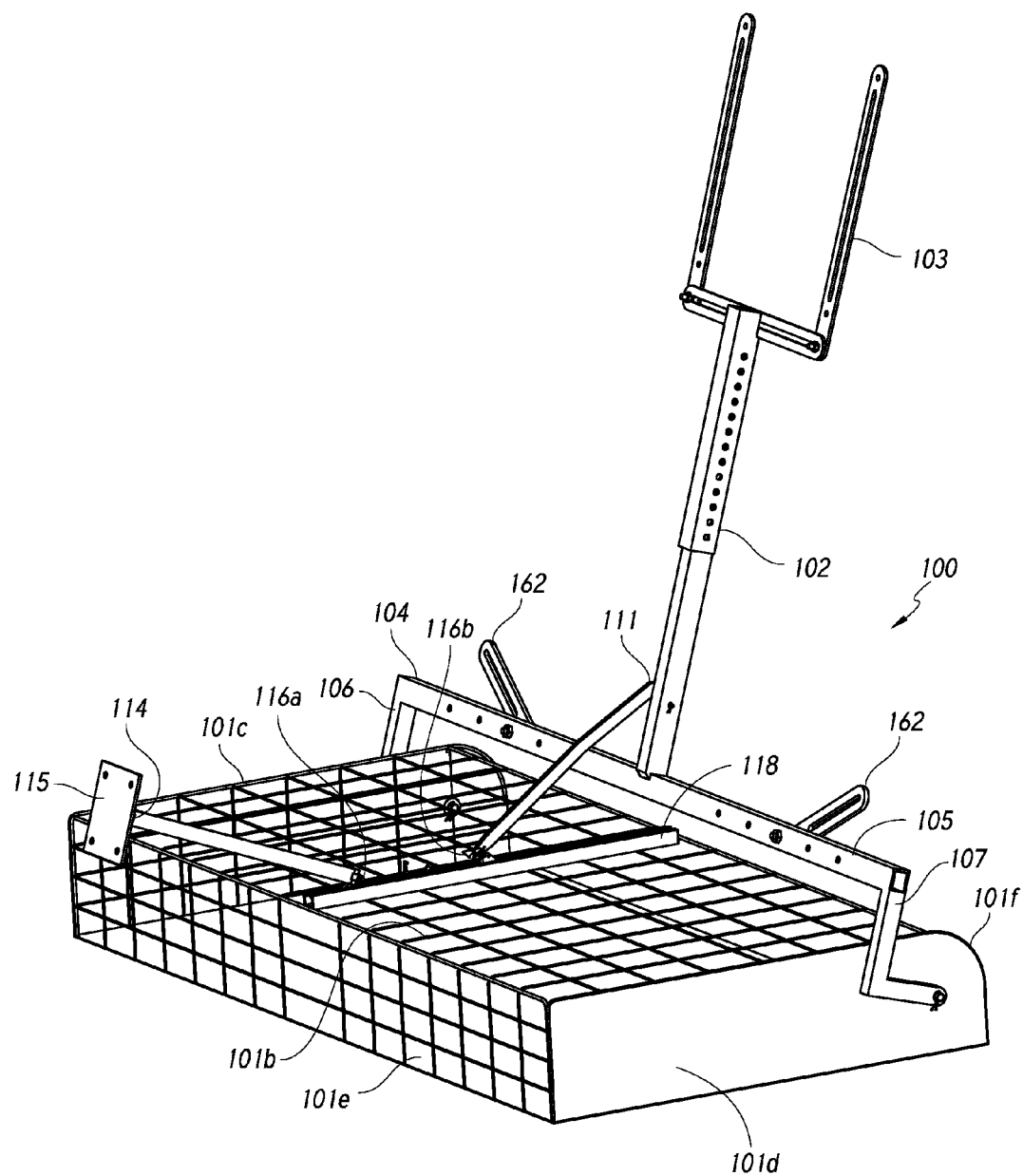
FIG. 24 is a back perspective view of the media machine responsive support mount of FIG. 23.
Figure 25:
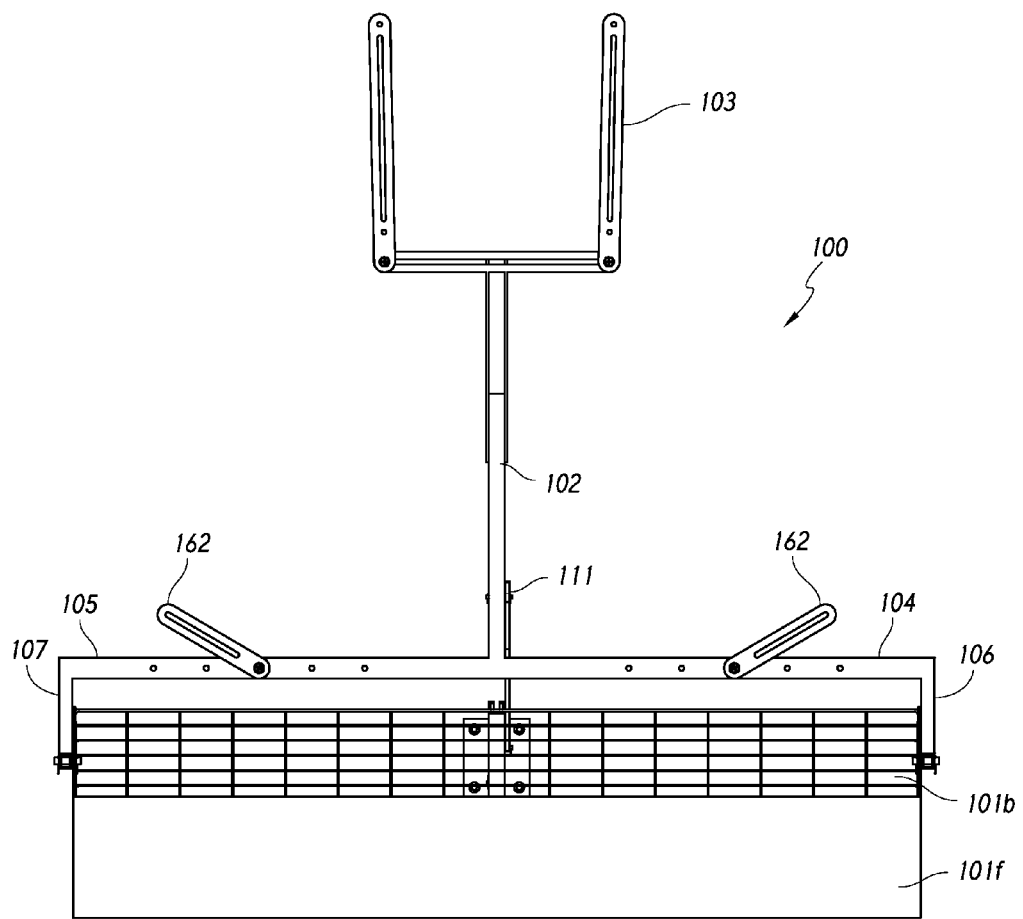
FIG. 25 is a front view of the media machine responsive support mount of FIG. 23.
Figure 26:
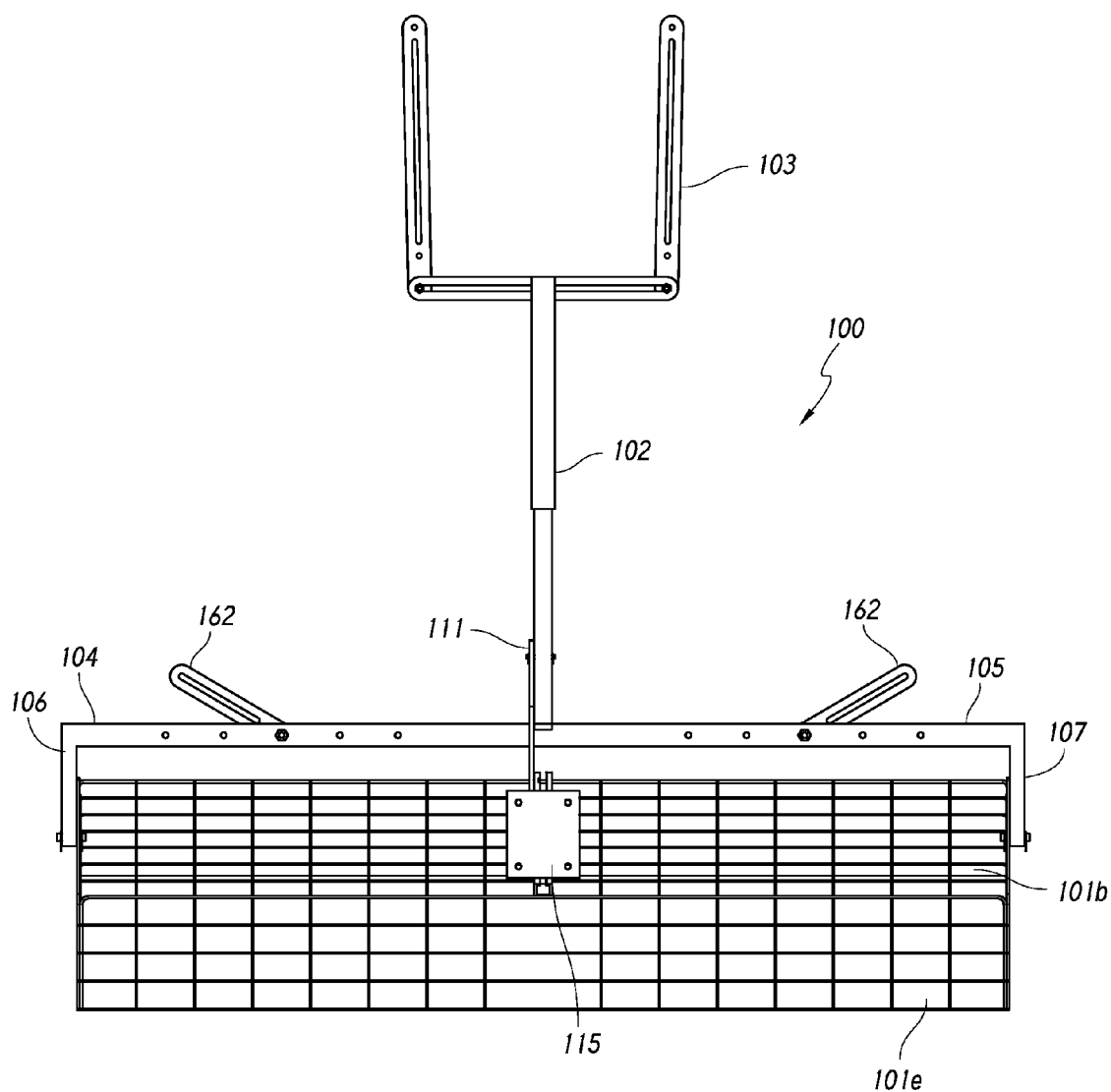
FIG. 26 is a back view of the media machine responsive support mount of FIG. 23.
Figure 27:
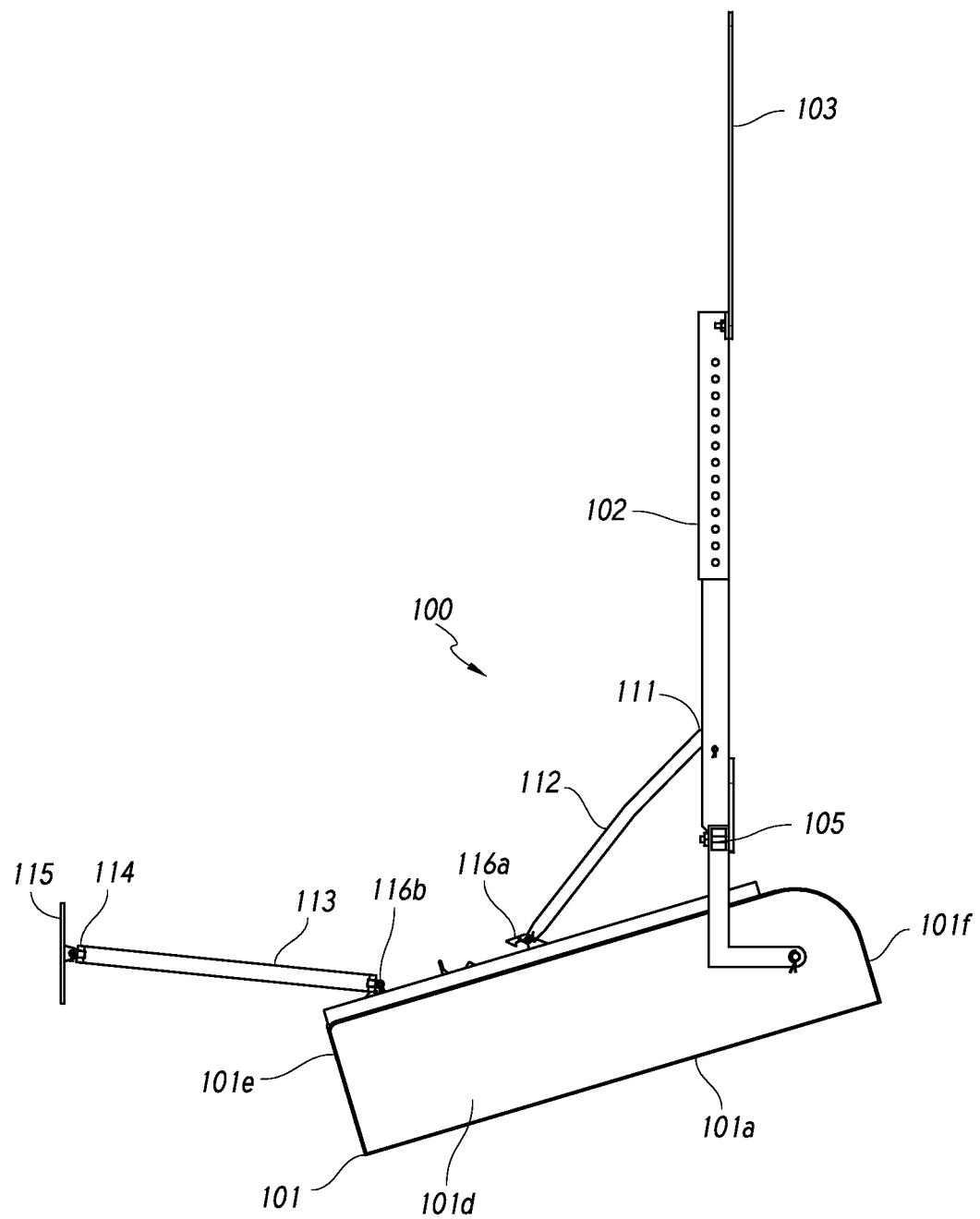
FIG. 27 is a first side view of a media machine responsive support mount.
Figure 28:
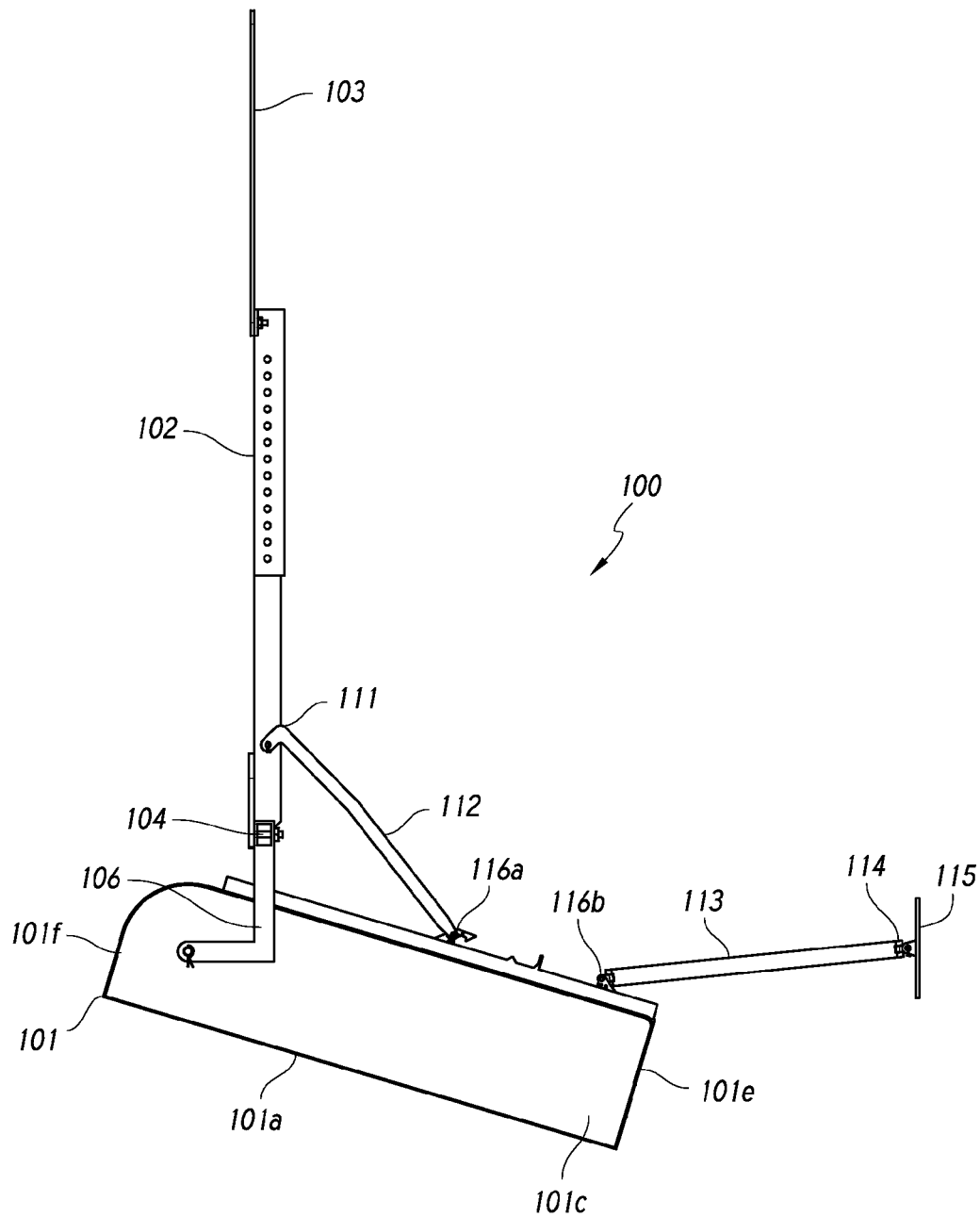
FIG. 28 is a second side view of a media machine responsive support mount.
Figure 29:
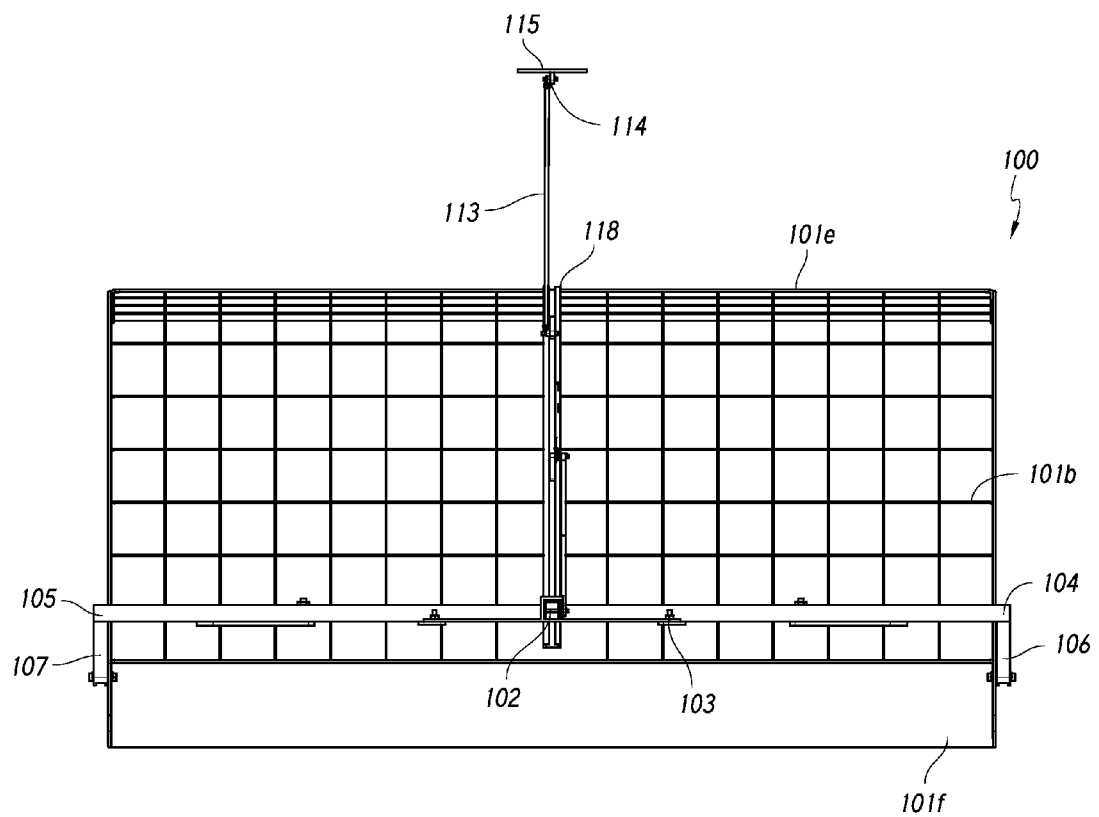
FIG. 29 is a top view of a media machine responsive support mount.
Figure 30:
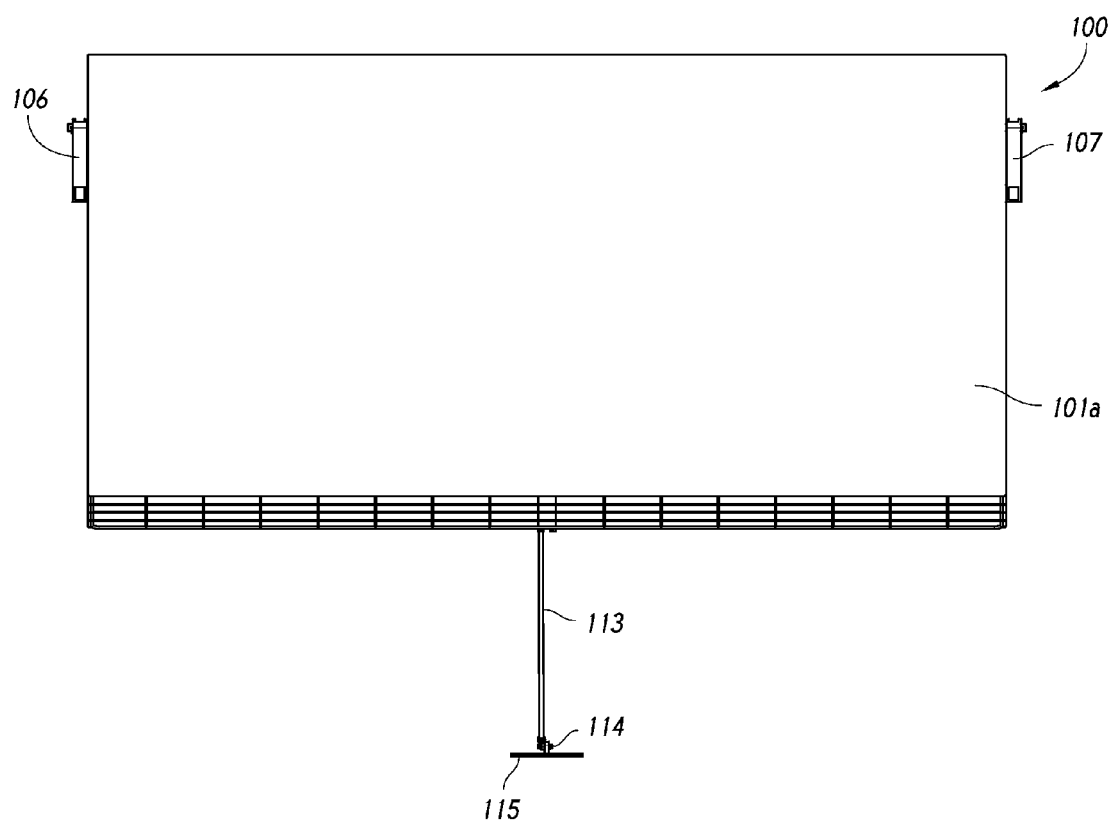
FIG. 30 is a bottom view of a media machine responsive support mount.

FIGS. 13-15 and 20 show exemplary preferred responsive support systems in an exemplary accessible position (away from the wall) and an exemplary accessible orientation (horizontal). In this exemplary accessible position and exemplary accessible orientation, the media machine 120 is accessible to the user through the presented accessible side perimeter edge 101f. The accessible side perimeter edge 101f may be completely open or may have an openable/closeable door that can selectively be opened by a user accessing the media machine 120. In addition to the exemplary accessible position and an exemplary accessible orientation of FIGS. 13-15 and 20, additional exemplary accessible positions and exemplary accessible orientations are not only possible, but highly likely. FIG. 21 shows a responsive support system in an accessible position and orientation, angled to the right. FIG. 22 shows a responsive support system in an accessible position and orientation, angled to the left. Depending, for example, on the subsystems (and particularly structure such as hinges and ball joints) used to transition the support 101 between positions/orientations, the responsive support mount 100 (and possibly the wall support mount 150) may have accessible positions/orientation that are horizontally off-center (left and right), vertically off-center (up and down), and/or omnidirectionally off-center.

Additional Features

The following features may be incorporated with other features disclosed herein. For example, although audio equipment is not shown in FIGS. 1-15, audio equipment may be incorporated into the first preferred responsive support system.

FIGS. 16-20 and 23-30 show optional audio equipment such as the speaker bar 160 and/or audio equipment attachment structure 162. The audio equipment attachment structure 162 may be adjustable to accommodate different types of audio equipment. The audio equipment attachment structure 162 may be attached to one or more of the components of the responsive support mount 100 and/or the wall support mount 150.

FIGS. 23-30 show the upper arm support member 112 and the lower arm support member 113 being unconnected by a single elbow support member 116. Instead, as shown particularly in FIGS. 27 and 28, the upper arm support member 112 has a track connector support member 116a and the lower arm support member 113 a track connector support member 116b. The track connector support members 116a, 116b are associated with (shown as at least partially positioned within) the at least one slide, track, or guide 118. The track connector support members 116a, 116b may be completely separate, may be joined by unseen mechanisms (e.g. chains, links, springs), or may be joinable in some configurations.

FIG. 31 shows an alternative preferred responsive support system 100' that is not associated with a specific wall-mounting device. In this alternative preferred responsive support system 100', the lifting subsystem is substantially as described above including structure such as the support 101, the upper arm support member 112, the lower arm support member 113, and the at least one slide, track, or guide 118. In addition, at least one stabilizing subsystem may be used. The shown stabilizing subsystem is shown as being positioned below the lifting subsystem. Alternatively, the stabilizing subsystem may be positioned above the lifting subsystem. The shown stabilizing subsystem includes a pivotable "shoulder" stabilizing support member 171, a slidable and pivotable "upper arm" stabilizing support member 172, a slidable and pivotable "lower arm" stabilizing support member 173, a pivotable "wrist" stabilizing support member 174, and "hand" or "bracket" stabilizing support member 175. An "elbow" stabilizing support member 176 may connect the upper arm stabilizing support member 172 and the lower arm stabilizing support member 173. This elbow stabilizing support member 176 may pivot downward (away from the lifting subsystem). Stabilizing subsystems may be on both sides of the support 101. The discrete media machine responsive support mount 100 may have an optional bar speaker 160.

It should be noted that the secondary responsive support mount 100 would most likely be used for supporting the media machine below the screen device 130. Alternative secondary responsive support mounts could, however, support the media machine above or to the side of the screen device 130.

Figure 34:
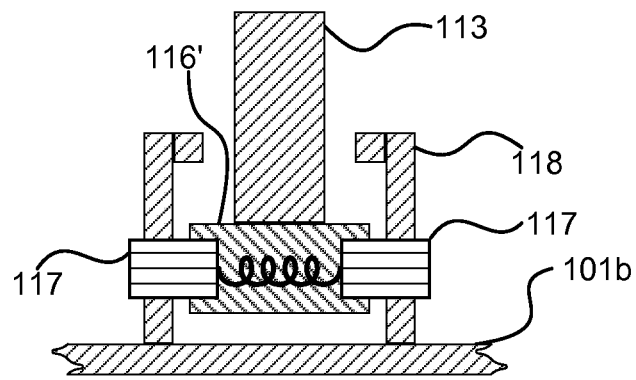
FIG. 34 is a cross-sectional view of an elbow support member with an internal unified locking/release mechanism, the pegs of the unified locking/release mechanism being pushed by a spring outward through respective apertures in the guide.
Figure 35:
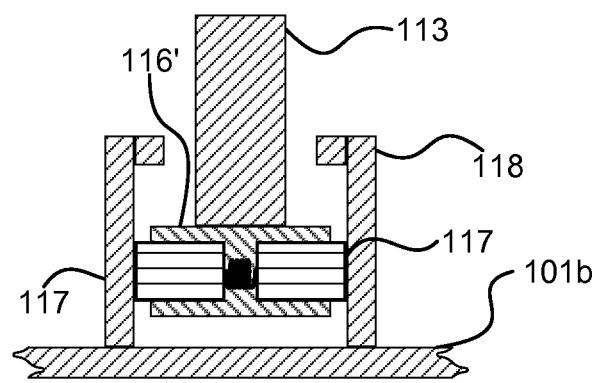
FIG. 35 is a cross-sectional view of an elbow support member with an internal unified locking/release mechanism of FIG. 34, the pegs of the unified locking/release mechanism being compressed to allow the elbow support member to slide through the guide.

It should be noted that the responsive support system may include one or more locking mechanisms that hold the media machine support 101 in positions and/or orientations. For example, there may be locking mechanisms to hold the media machine support 101 in the storage position and/or orientation. Another example is that there may be locking mechanisms to hold the media machine support 101 in the accessible position and/or orientation. The locking mechanism may be incorporated in the elbow support member 116 and/or the slide, track, or guide 118. A release mechanism may be associated with the locking mechanism. FIGS. 34 and 35 show simplified exemplary unified locking/release mechanism 117 within an associated exemplary elbow support member 116'. The unified locking/release mechanism 117 includes a spring having two sides (shown as a spiral spring, but could be a leaf spring or other mechanism that expands outward when not contracted), each side having an associated "peg." The shown guide 118 has a pair of apertures at predetermined locations through which the pegs are pushed (by the spring) when the elbow support member 116' passes thereby. When the pegs extend through the apertures, the elbow support member 116' is held in position which holds the support 101 in the predetermined orientation associated with that pair of apertures. Pushing the pegs inward (compressing the spring) releases the locking/release mechanism 117. The shown unified locking/release mechanism 117 can be thought of as or replaced with structure similar to tent pole locking pins.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not.

All references (including, but not limited to, foreign and/or domestic publications, patents, and patent applications) cited herein (including in the Background), whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A responsive support system for supporting an electronic display device and storing a media machine, the responsive support system, comprising:
(a) a screen device wall support mount having a screen device bracket for mounting a flat display screen thereto, a wall bracket plate for mounting the responsive support system to a wall, and an arm extending between screen device bracket and the wall bracket plate; and
(b) a media machine responsive support mount receptacle for storing a media machine, said media machine responsive support mount receptacle having a support surface that is adapted to support the media machine, two sidewalls and a rear wall that are each perpendicular to the support surface, wherein a storage space is defined between the two sidewalls and the rear wall;
wherein at least one support member connects the media machine responsive support mount receptacle to the screen device bracket, and a lower arm support connects the media machine responsive support mount receptacle to the wall;
wherein the media machine responsive support mount receptacle is rotatable between a at least one storage position wherein the support surface is in a vertical orientation and at least one accessible position wherein the support surface is in a horizontal orientation.

2. The responsive support system of claim 1, at least one storage orientation of said media machine responsive support mount being generally vertical and at least one accessible orientation of said media machine responsive support mount being generally horizontal.

3. The responsive support system of claim 1, said media machine responsive support mount being below said screen device wall support mount.

4. The responsive support system of claim 1, said screen device wall support mount having at least one storage orientation and at least one accessible orientation.

5. The responsive support system of claim 1, said screen device wall support mount having at least one vertical storage orientation and at least one angled accessible orientation.

6. The responsive support system of claim 5, wherein said media machine responsive support mount transitions between the at least one storage position and orientation and the at least one accessible position and orientation upon actuation of said screen device wall support mount.

7. The responsive support system of claim 5, said media machine responsive support mount having a rotating subsystem and a lifting subsystem, said rotating subsystem and said lifting subsystem facilitating the transition of said media machine responsive support mount between the at least one storage position and orientation and the at least one accessible position and orientation.

8. A media machine responsive support mount receptacle for storing a media machine, wherein the media machine responsive support mount receptacle is adapted to be attached to a screen device wall bracket for supporting a flat screen display, and a support wall, the media machine responsive support mount receptacle comprising:
a support receptacle for supporting the media machine, the support receptacle
having a support surface that is adapted to support the media machine, two sidewalls and a rear wall that are each perpendicular to the support surface, and a second surface that is parallel to the support surface, and a track defined in guide rail that is fixed to the second surface, wherein a storage space is defined between the two sidewalls, the rear wall, the support surface, and the second surface;
wherein at least one support member is attached to the two side walls of the support receptacle and extends upwardly from the support member; the at least one support member is configured to connect the support receptacle to the screen device bracket;
wherein a upper arm support extends between and connects the guide rail to the at least one support member and a lower arm support extends between and connects the guide rail of the support receptacle to the support wall via a bracket support plate;
wherein respective ends of the upper arm support and the lower arm support each comprise a track connector which is inserted within the track of the guide rail to enable the upper arm support and the lower arm support to simultaneously slide along the track of the guide rail in order to rotate the support receptacle between at least one storage position wherein the support surface is in a vertical orientation and at least one accessible position wherein the support surface is in a horizontal orientation when the at least one support member of the support receptacle is attached to the screen device wall bracket and the bracket support plate is attached to the wall.

9. The media machine responsive support mount of claim 8, at least one storage orientation of said media machine responsive support mount being generally vertical and at least one accessible orientation of said media machine responsive support mount being generally horizontal.

10. The media machine responsive support mount of claim 9, wherein
said media machine responsive support mount transitions between the at least one storage position and orientation and the at least one accessible position and orientation upon actuation.

11. The media machine responsive support mount of claim 8, wherein, when in use, said screen device wall support mount has at least one storage position and at least one accessible position.

12. The media machine responsive support mount of claim 9,
wherein, when in use, said screen device wall support mount has at least one storage position and at least one accessible position and said media machine responsive support mount transitions between the at least one storage position and orientation and the at least one accessible position and orientation upon
actuation of the transition of said screen device wall support mount between said at least one storage position and said at least one accessible position.

13. A responsive support system for supporting an electronic display device and storing a media machine, the responsive support system comprising:
(a) a screen device wall support mount having a screen device bracket for mounting a display screen thereto, a wall bracket plate for mounting the responsive support system to a wall, two linkage arms extending between the screen device bracket and the wall bracket plate; wherein the linkage arms are each extendable and retractable between at least one storage
position wherein the screen device bracket is a first distance from the wall and at least one accessible position wherein the screen device bracket is a second distance from the wall, wherein the second distance is greater than the first distance; and
(b) a media machine responsive support mount receptacle for storing a media machine, said media machine responsive support mount receptacle having a support surface that is adapted to support the media machine, and two sidewalls and a rear wall that are each perpendicular to the support surface,
wherein at least one support member connects the media machine responsive support mount receptacle to the screen device bracket;
wherein the media machine responsive support mount receptacle is rotatable between at least one storage position wherein the support surface is in a vertical orientation and at least one accessible position wherein the support surface is in a horizontal orientation.

14. The responsive support system of claim 13, at least one storage orientation of said media machine responsive support mount being generally vertical and at least one accessible orientation of said media machine responsive support mount being generally horizontal.

15. The responsive support system of claim 13, said media machine responsive support mount being below said screen device wall support mount.

16. The responsive support system of claim 13, said screen device wall support mount having at least one vertical storage orientation and at least one angled accessible orientation.

17. The responsive support system of claim 14, wherein said media machine responsive support mount transitions between the at least one storage position and orientation and the at least one accessible position and orientation upon actuation of said screen device wall support mount.

\* \* \* \* \*